US012602629B2

(12) United States Patent
Sinclair et al.

(10) Patent No.: US 12,602,629 B2
(45) Date of Patent: Apr. 14, 2026

(54) USING MACHINE LEARNING TO PREDICT FLEET MOVES IN HYDRAULIC FRACTURING OPERATIONS

(71) Applicant: Typhon Technology Solutions (U.S.), LLC, The Woodlands, TX (US)

(72) Inventors: Connor Moore Sinclair, The Woodlands, TX (US); Matthew James Vahsholtz, Conroe, TX (US)

(73) Assignee: Typhon Technology Solutions (U.S.), LLC, The Woodlands, TX (US)

( * ) Notice: Subject to any disclaimer, the term of this patent is extended or adjusted under 35 U.S.C. 154(b) by 256 days.

(21) Appl. No.: 18/100,491

(22) Filed: Jan. 23, 2023

(65) Prior Publication Data

US 2023/0237392 A1     Jul. 27, 2023

Related U.S. Application Data

(60) Provisional application No. 63/301,610, filed on Jan. 21, 2022.

(51) Int. Cl.
*G06Q 10/0631*     (2023.01)
*G06N 7/01*     (2023.01)

(52) U.S. Cl.
CPC ........... *G06Q 10/0631* (2013.01); *G06N 7/01* (2023.01)

(58) Field of Classification Search
CPC ............................. G06Q 10/0631; G06N 7/01
USPC ......................................................... 705/7.12
See application file for complete search history.

(56) References Cited

U.S. PATENT DOCUMENTS

| | | | | |
|---|---|---|---|---|
| 11,748,834 | B1 * | 9/2023 | Miller ................ | G06Q 10/0635 705/7.15 |
| 2018/0075547 | A1 * | 3/2018 | Pere ................. | G06Q 10/06312 |
| 2018/0283102 | A1 * | 10/2018 | Cook .................. | E21B 43/2607 |
| 2021/0348490 | A1 * | 11/2021 | Wheatley ............... | E21B 47/02 |
| 2022/0025753 | A1 * | 1/2022 | Heidari ................ | E21B 49/005 |

OTHER PUBLICATIONS

"A comprehensive framework of factory-to-factory dynamic fleet-level prognostics and operation management for geographically distributed assets", Jin et al., Oct. 7, 2015 (Year: 2015).*

* cited by examiner

*Primary Examiner* — Po Han Lee
(74) *Attorney, Agent, or Firm* — Fenwick & West LLP

(57)     ABSTRACT

Activity data associated with a fleet move is received. The activity data is associated with performance of activities for one or more events according to a move play prescribed for the fleet move. A plurality of features associated with the activity data are extracted. The extracted features are input into a machine learning model that is trained based on features of historical activity data of historical fleet moves. A probability of the fleet move having the prescribed move play failing to complete within a predetermined timeframe is received as output from the machine learning model. In response to the probability being higher than a threshold, one or more recommendations configured to improve a likelihood of the fleet move being completed within the predetermined timeframe or reduce overtime, are generated. A graphical user interface of a client device is caused to display the one or more recommendations.

20 Claims, 12 Drawing Sheets

400

| # | Event Name & Description |
|---|---|
| 1 | Close Well — Denotes the start of the move |
| 2 | Open Well — Denotes the end of the move |
| 3 | CNPT- Customer Non-Productive Time |
| 4 | Maintenance Event — Maintenance performed on equipment — might happen at the conclusion of a move or following a particular piece of equipment. |
| 5 | PO-GT 13.8 Power Out — Power is sent out from Gas Turbine, ready to electrify the fleet |
| 6 | PU-Event — Prime up and Pressure Test |
| 7 | RD-Blender |
| 8 | RD-Cables - Grounding |
| 9 | RD-Chemicals - Hoses/Skids/ISOs |
| 10 | RD-Data Van - Including Comms |
| 11 | RD-EVO Gas Conditioning Skid |
| 12 | RD-GT-Main and Air Handler (Gas Turbine main trailer and air handler) |
| 13 | RD-Iron - Manifold to WH |
| 14 | RD-Iron - Pumps to Manifold (Koflex hoses) |
| 15 | RD-Iron - Restraints |
| 16 | RD-Switchgear |
| 17 | T-APU |
| 18 | T-Blender |
| 19 | T-Chemicals - Hoses/Skids/ISOs |
| 20 | T-Data Van - Including Comms |
| 21 | T-EVO Crane |
| 22 | T-EVO Gas Conditioning Skid |
| 23 | T-Flatbed - Additional |

| # | Event Name & Description |
|---|---|
| 24 | T-Flatbed - Cables |
| 25 | T-Flatbed - Hoses & Backside Equipment |
| 26 | T-Flatbed 1 |
| 27 | T-Flatbed 2 |
| 28 | T-GT-Main and Air Handler (Gas Turbine main trailer and air handler) |
| 29 | T-Iron Trailer 1 |
| 30 | T-Maintenance Trailer 1 |
| 31 | T-Maintenance Trailer 2 |
| 32 | T-Pump Trailer - Set 1 |
| 33 | T-Pump Trailer - Set 2 |
| 34 | T-Pump Trailer - Set 3 |
| 35 | T-Switchgear |
| 36 | RU-Blender |
| 37 | RU-Cables - Grounding |
| 38 | RU-Cables — Megger — Meg Testing, a type of cable testing to ensure no issues |
| 39 | RU-Chemicals - Hoses/Skids/ISOs |
| 40 | RU-Data Van - Including Comms |
| 41 | RU-EVO Gas Conditioning Skid |
| 42 | RU-Ground Field Certification — Testing of cables to ensure appropriate grounding |
| 43 | RU-GT-Main and Air Handler (Gas Turbine main trailer and air handler) |
| 44 | RU-Iron - Manifold to WH |
| 45 | RU-Iron - Pumps to Manifold |
| 46 | RU-Switchgear |

| Event | Start Time to End Time | User Groups |
|---|---|---|
| Close Well | Hour 0 | Hands 0 |
| RD-Cables - Grounding | Hour 2 to Hour 6 | Hands 4 (Group 1) |
| RD-Iron - Pumps to Manifold | Hour 2 to Hour 8 | Hands 4 (Group 2) |
| RD-Switchgear | Hour 2 to Hour 6 | Hands 4 (Group 3) |
| RD-Chemicals - Hoses/Skids/ISOs | Hour 6 to Hour 10 | Hands 2 (Group 1) |
| RD-Blender | Hour 8 to Hour 16 | Hands 6 (Group 1 & 2) |
| RD-EVO Gas Conditioning Skid | Hour 6 to Hour 10 | Hands 4 (Group 3) |
| RD-GT-Main and Air Handler | Hour 10 to Hour 16 | Hands 4 (Group 3 & 4) |
| RD-Data Van - Including Comms | Hour 14 to Hour 16 | Hands 2 (Group 1) |
| RU-Cables — Megger | Hour 21 to Hour 22 | Hands 2 (Group 3) |
| RU-Iron - Pumps to Manifold | Hour 16 to Hour 22 | Hands 4 (Group 2) |
| RU-Switchgear | Hour 22 to Hour 26 | Hands 4 (Group 3) |
| RU-Cables - Grounding | Hour 26 to Hour 28 | Hands 4 (Group 3) |
| RU-Blender | Hour 22 to Hour 28 | Hands 6 (Group 1 & 2) |
| RU-Chemicals - Hoses/Skids/ISOs | Hour 18 to Hour 22 | Hands 2 (Group 1) |
| RU-Data Van - Including Comms | Hour 22 to Hour 24 | Hands 2 (Group 1) |
| RU-EVO Gas Conditioning Skid | Hour 24 to Hour 28 | Hands 2 (Group 1) |
| RU-Ground Field Certification | Hour 28 to Hour 29 | Hands 4 (Group 3) |
| RU-GT-Main and Air Handler | Hour 22 to Hour 28 | Hands 4 (Group 4) |
| PO-GT 13.8 Power Out | Hour 30 | |
| PU | Hour 31 | |
| Open Well | Hour 32 | |

1000

DETECT THAT ACTIVITY DATA ASSOCIATED WITH A FLEET MOVE HAS BEEN RECEIVED, THE ACTIVITY DATA ASSOCIATED WITH PERFORMANCE OF ACTIVITIES FOR ONE OR MORE EVENTS ACCORDING TO A MOVE PLAY PRESCRIBED FOR THE FLEET MOVE 1005

EXTRACT A PLURALITY OF FEATURES ASSOCIATED WITH THE ACTIVITY DATA 1010

INPUT THE EXTRACTED FEATURES INTO A MACHINE LEARNING MODEL, THE MACHINE LEARNING MODEL TRAINED BASED ON FEATURES OF HISTORICAL ACTIVITY DATA OF HISTORICAL FLEET MOVES 1015

RECEIVE AS OUTPUT FROM THE MACHINE LEARNING MODEL, A PROBABILITY OF THE FLEET MOVE HAVING THE PRESCRIBED MOVE PLAY FAILING TO COMPLETE WITHIN A PREDETERMINED TIMEFRAME 1020

IN RESPONSE TO THE PROBABILITY BEING HIGHER THAN A THRESHOLD, GENERATE ONE OR MORE RECOMMENDATIONS CONFIGURED TO IMPROVE A LIKELIHOOD OF THE FLEET MOVE BEING COMPLETED WITHIN THE PREDETERMINED TIMEFRAME OR REDUCE OVERTIME 1025

CAUSE A GRAPHICAL USER INTERFACE OF A CLIENT DEVICE TO DISPLAY THE ONE OR MORE RECOMMENDATIONS 1030

USING MACHINE LEARNING TO PREDICT FLEET MOVES IN HYDRAULIC FRACTURING OPERATIONS

CROSS REFERENCE TO RELATED APPLICATIONS

This application claims the benefit of U.S. Provisional Application No. 63/301,610, filed Jan. 21, 2022, which are incorporated by reference in their entirety.

TECHNICAL FIELD

This disclosure relates generally to hydraulic fracturing. More particularly, but not by way of limitation, this disclosure relates to using machine learning models to predict whether an operation to move a hydraulic fracturing fleet from one frac pad to another frac pad will be completed on time.

BACKGROUND

Hydraulic fracturing has been commonly used by the oil and gas industry to stimulate production of hydrocarbon wells, such as oil and/or gas wells. Hydraulic fracturing, sometimes called "fracing" or "fracking," is the process of injecting fracturing fluid, which is typically a mixture of water, sand, and chemicals, into the subsurface to fracture the subsurface geological formations and release otherwise encapsulated hydrocarbon reserves. The fracturing fluid is typically pumped into a wellbore at a relatively high pressure sufficient to cause fissures within the underground geological formations. Specifically, once inside the wellbore, the pressurized fracturing fluid is pressure pumped down and then out into the subsurface geological formation to fracture the underground formation. A fluid mixture that may include water, various chemical additives, and proppants (e.g., sand, or ceramic materials) can be pumped into the underground formation to fracture and promote the extraction of the hydrocarbon reserves, such as oil and/or gas.

Implementing large-scale fracturing operations at well sites typically require extensive investment in equipment, labor, and fuel. For instance, a typical fracturing operation uses a variety of fracturing equipment, numerous personnel to operate and maintain the fracturing equipment, large amounts of fuel to power the fracturing operations, and large volumes of fracturing fluids. As such, planning for fracturing operations is often complex and encompasses a variety of logistical challenges that include minimizing the on-site area or "footprint" of the fracturing operations, providing adequate power and/or fuel to continuously power the fracturing operations, increasing the efficiency of the hydraulic fracturing equipment, minimizing equipment downtime (e.g., non-productive time (NPT)), and reducing any environmental impact resulting from fracturing operations.

Moreover, hydraulic fracturing is transient in nature. It is common to move a frac fleet (e.g., hydraulic fracturing fleet) from well pad (e.g., frac pad) to well pad multiple times per month. A single frac fleet may include 20+ semi-trailer loads of equipment including power generation trailers, fracturing trailers, hydration and blender trailers, sand silos, chemical storage containers, iron, hoses, cabling, etc. Each time the frac fleet is moved to a new well pad (e.g., fleet move), a variety of operations need to be performed to rig down components (e.g., equipment) that make up the frac fleet, transit the components to the new well pad on the semi-trailers, and rig up and test the components at the new well pad before the hydraulic fracturing operations can begin. It is desirable to minimize the amount of time it takes a frac crew to complete a fleet move including time to break down (e.g., disassemble) all equipment (i.e., rig down) on pad A, move the equipment to pad B (i.e., transit), then re-assemble and complete testing of the equipment at pad B (i.e., rig up). For example, a frac equipment operator may set a target duration for completing a given fleet move and measure actual performance against the set target duration. Numerous logistical and operational challenges make it difficult to ensure the fleet move will be completed within the set target duration. Moreover, it is difficult to know beforehand (e.g., while the move is in progress) whether or not the fleet move will be completed on time.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment, a method includes a plurality of steps. The steps include a step of detecting that activity data associated with a fleet move has been received, the activity data associated with performance of activities for one or more events according to a move play prescribed for the fleet move. The steps further include a step of extracting a plurality of features associated with the activity data, and a step of inputting the extracted features into a machine learning model, the machine learning model trained based on features of historical activity data of historical fleet moves. The steps further include a step of receiving, as output from the machine learning model, a probability of the fleet move having the prescribed move play failing to complete within a predetermined timeframe. The steps further include a step of generating, in response to the probability being higher than a threshold, one or more recommendations configured to improve a likelihood of the fleet move being completed within the predetermined timeframe or reduce overtime. And the steps further include a step of causing a graphical user interface of a client device to display the one or more recommendations.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 illustrates a plurality of events, some, or all of which may be included in a prescribed move play, in accordance with some embodiments.

FIG. 6 illustrates an exemplary move play selected based on input parameters for a fleet move, in accordance with some embodiments.

FIG. 10 is a flowchart illustrating a method for predicting fleet moves, in accordance with some embodiments.

DESCRIPTION

Figure 1:
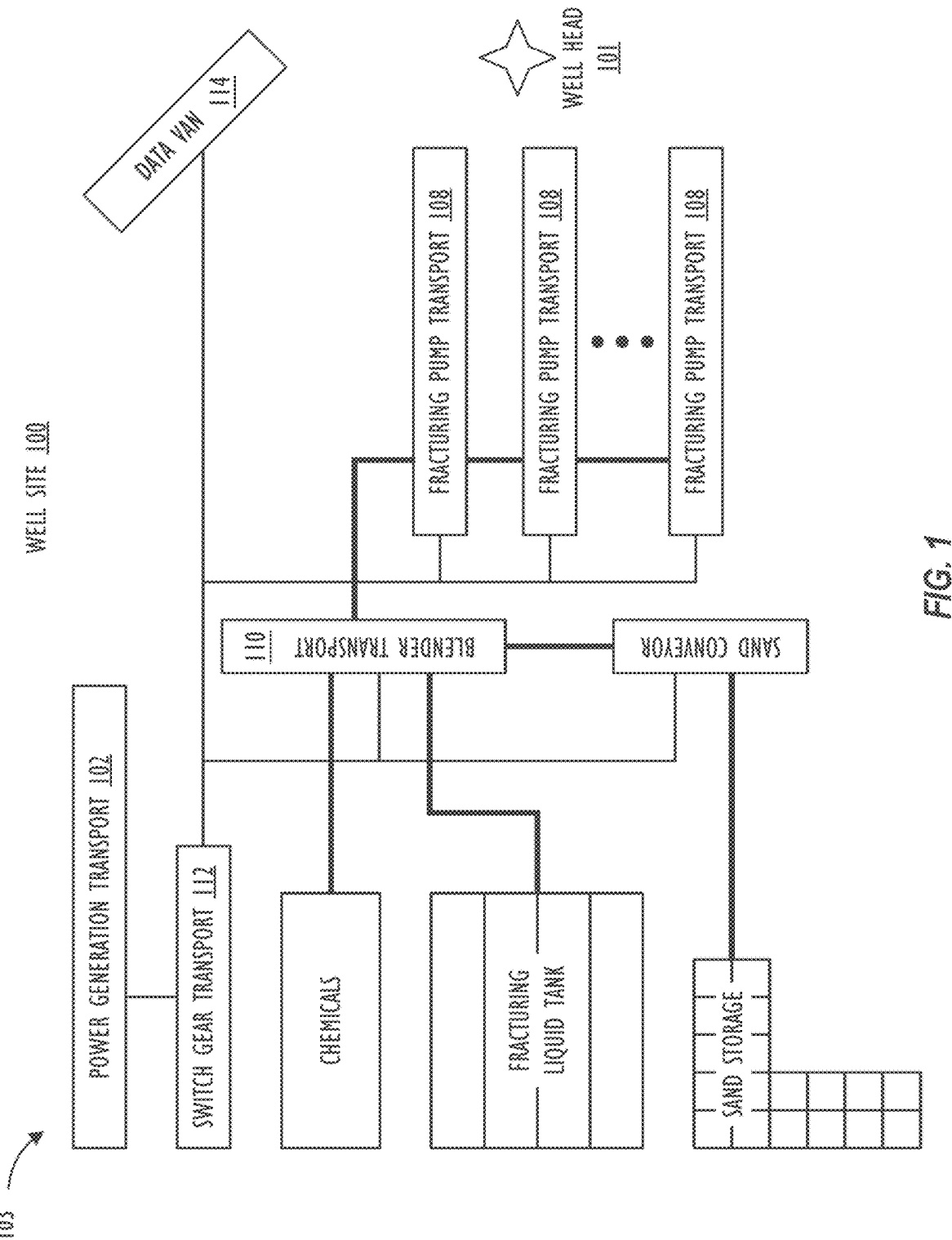
FIG. 1 is a schematic diagram of a mobile hydraulic fracturing system operating at a well site, in accordance with some embodiments.

In the following description, for purposes of explanation, numerous specific details are set forth in order to provide a thorough understanding of the inventive concept. In the interest of clarity, not all features of an actual implementation are described. Moreover, the language used in this disclosure has been principally selected for readability and instructional purposes and may not have been selected to delineate or circumscribe the inventive subject matter, resort to the claims being necessary to determine such inventive subject matter. Reference in this disclosure to "one embodiment" or to "an embodiment" or "another embodiment" or "some embodiments" or "other embodiments" means that a particular feature, structure, or characteristic described in connection with the embodiment is included in at least one embodiment of the invention, and multiple references to "one embodiment" or "an embodiment" or "another embodiment" or "some embodiments" or "other embodiments" should not be understood as necessarily all referring to the same embodiment.

The terms "a," "an," and "the" are not intended to refer to a singular entity unless explicitly so defined but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

As used herein, the term "transport" refers to any transportation assembly, including, but not limited to, a trailer, truck, skid, and/or barge used to transport relatively heavy structures, such as a gas turbine, a generator, one or more fracturing pumps, a pump prime mover, and the like.

As used herein, the term "trailer" refers to a transportation assembly used to transport the relatively heavy structures that can be attached and/or detached from a transportation vehicle used to pull or move the trailer. In one embodiment, the trailer may include the mounts and manifold systems to connect the trailer to other equipment.

As used herein, the term "lay-down trailer" refers to a trailer that includes two sections with different vertical heights. One of the sections or the upper section is positioned at or above the trailer axles and another section or the lower section is positioned at or below the trailer axles. In one embodiment the main trailer beams of the lay-down trailer may be resting on the ground when in operational mode and/or when uncoupled from a transportation vehicle, such as a tractor.

Configuration Overview

This disclosure pertains to using machine learning to predict whether a fleet move that is currently in progress to move equipment of a hydraulic fracturing fleet from one frac pad to another pad will complete successfully within a predetermined timeframe. A fleet move may include rig down events, transit events, and rig up events and may be performed in accordance with a prescribed move play. The predetermined timeframe may be a target timeframe within which an operator wishes to (or is obligated to) complete the fleet move. For example, the timeframe may correspond to the time between "closing" a first well (e.g., stopping of hydraulic fracturing operations at the first well at a first wellsite) and "opening" a second well (e.g., starting of hydraulic fracturing operations at a second well at a second wellsite that is remote to the first well site).

In some embodiments, a move orchestration system may include a front-end move application deployed on client devices (e.g., operator devices, crew devices) associated with crew members performing activities for the fleet move and operators supervising the crew members and assigning the events to the respective crew members. That is, the operators associated with the frac fleet may interact with the move application on respective operator devices to create a fleet move by inputting parameters of the fleet move such as origin pad layout (e.g., pad design), destination pad layout, amount and type of equipment, number of available crew members to move the frac fleet, outside constraints like time-of-day limitations or anticipated 3rd party delays, and the like.

A back-end planning engine of the move orchestration system may analyze the input parameters to create the fleet move, and further prescribe, from among a plurality of predefined move plays, a move play based on the input parameters for the new fleet move (e.g., based on at least the origin pad layout and the destination pad layout). The planning engine may be a rule-based engine that applies predefined rules (e.g., series of if-then rules) to select a particular move play (e.g., a move plan formula; including a target timeframe) that best fits the given specifics of the fleet move defined by the input parameters. Each predefined move play may include instructions orchestrating performance of activities for a plurality of events. For example, the events may include rig down events, transit events, and rig up events.

The move play may also define an order in which activities corresponding to the plurality of events are to be performed, a start time and an end time (e.g., duration) for performing activities associated with the event, and identify assigned user groups (e.g., each group of one or more crew members) who are responsible for performing the activities associated with the event. Based on the prescribed move play for the fleet move (which may be subject to approval by an operator before the play is put into action), the move orchestration system may control the move application to transmit instructions to respective crew devices associated with the crew members (or with the user groups) to whom the respective events of the move play are assigned.

Based on the received instructions on the crew devices, the crew members of the user groups may perform the respective assigned activities associated with the respective events, and log data associated with the performance of the activities into the move application as activity data. For example, a first crew member (or first user group) assigned to a first event of the prescribed move play for the fleet move may perform activities related to the first event and log corresponding data (e.g., event start time, event end time, etc.) by interacting with the instance of the move application installed on the crew device associated with the first crew member (or first user group), and a second crew member (or second user group) assigned to a second event of the prescribed move play for the fleet move may perform activities related to the second event and log corresponding data (e.g., event start time, event end time, etc.) by interacting with the instance of the move application installed on the crew device associated with the second crew member (or second user group), and so on.

Based on the activity data received from the plurality of crew devices, the move orchestration system may generate a real-time interface (e.g., Gantt chart) showing the current status of the overall fleet move and of the different events scheduled to be completed in the fleet move per the prescribed move play. Users (e.g., crew members, operators) of the system may interact with the move application to view the real-time interface on their client devices.

In some embodiments, the move orchestration system may utilize one or more machine learning models that are trained based on historical activity data of historical fleet moves to perform predictions and recommendations based on the received activity data. The machine learning model may receive as input the activity data associated with the current fleet move and the prescribed move play and output a probability of the fleet move failing to complete within the predetermined timeframe. For example, the machine learning model may be trained to make the prediction based on activity data corresponding to the rig down events of the prescribed move play.

In some embodiments, the move orchestration system, based on the probability of the fleet move failing to complete within the predetermined timeframe being more than a threshold, may generate one or more recommendations configured to improve the likelihood of the fleet move being completed within the predetermined timeframe or to reduce amount of time it takes beyond the predetermined timeframe to complete the move. The recommendations may include recommendations to change the time duration for completing one or more outstanding events of the move play (e.g., instruct corresponding assigned crew members to complete the activities associated with the event in a determined amount of time that is less than a previously allotted time under the move play), change the order or sequence of performing activities associated with two or more of the outstanding events of the move play, recommend an alternate move play, and the like.

The move orchestration system may control the move application to present the recommendations on the operator devices. Upon receiving an indication that one or more of the recommendations have been accepted, the move orchestration system may perform operations to update the move play for a remainder of the events associated with the fleet move based on the accepted one or more recommendations. In some embodiments, the system may further control the move application to transmit instructions to respective crew devices associated with the crew members of the user groups to whom the respective events of the updated move play are assigned.

Based on the updated instructions received on the crew devices, the crew members of the assigned user groups may now perform the respective activities associated with the respective assigned events of the updated move play, and log data associated with the performance of the activities into the move application as activity data. The system may thus continuously monitor and perform predictions based on received activity data and update the move play as needed to attempt to bring back "on-track" a fleet move that has gone "off-track" such that the move can be completed within the predetermined timeframe, even after, e.g., initial activities associated with one or more events have taken longer time than prescribed by the move play.

The system facilitates an intelligent data-driven approach to frac fleet moves in a way that allows the complexity of the move to be represented in data. The system empowers operators to make confident, data-driven decisions in every phase of the move process, from planning to review. Further, by presenting the real-time status updates of the events of the move play on a single user interface (e.g., Gantt chart) and timeline, the system enables a holistic evaluation of move performance and allow operators to see the fleet move in a broad context.

Example Mobile Hydraulic Fracturing System

FIG. 1 is a schematic diagram of a mobile hydraulic fracturing system 103 operating at a well site 100, in accordance with one or more embodiments. The well site 100 comprises a wellhead 101 (e.g., frac pad including multiple wells) and the mobile fracturing system 103 (e.g., hydraulic fracturing fleet, frac fleet or system). Generally, the mobile fracturing system 103 may perform fracturing operations to complete a well and/or transform a drilled well into a production well. For example, the well site 100 may be a site where operators are in the process of drilling and completing a well. Operators may start the well completion process (e.g., well completion operation) after drilling, running production casing, and cementing within the wellbore. The operators may also insert a variety of downhole tools into the wellbore and/or as part of a tool string used to drill the wellbore. After the operators drill the well to a certain depth, a horizontal portion of the well may also be drilled and subsequently encased in cement. The operators may subsequently remove the rig, and the mobile fracturing system 103 may be moved onto the well site 100 to perform the well completion operation (e.g., fracturing operation) that force relatively high-pressure fracturing fluid through the wellhead 101 into subsurface geological formations to create fissures and cracks within the rock. The mobile fracturing system 103 may be moved off the well site 100 once the operators complete the well completion operation. Typically, the well completion operation for the well site 100 may last several days.

In some embodiments, the mobile fracturing system 103 may comprise a power generation transport 102 (e.g., mobile source of electricity) configured to generate electricity by converting hydrocarbon fuel, such as natural gas, obtained from one or more sources (e.g., a producing wellhead) at the well site 100, from a remote offsite location, and/or another relatively convenient location near the power generation transport 102. That is, the mobile fracturing system 103 may utilize the power generation transport 102 as a power source that burns cleaner while being transportable along with other fracturing equipment. The generated electricity from the power generation transport 102 may be supplied to fracturing equipment to power fracturing operations at one or more well sites, or to other equipment in various types of applications requiring mobile electric power generation.

As shown in FIG. 1, the power generation transport 102 may be implemented as a single power generation transport. In other embodiments, the power generation transport 102 may be implemented using two or more transports, and components of the power generation transport 102 may be arranged on the two or more transports in any reasonable manner. For example, the power generation transport 102 may be implemented using a two-transport design in which a first transport may comprise a turbine (e.g., gas turbine) and a generator, and a second transport may comprise an air filter box providing filtered combustion air for the turbine, and an exhaust stack that securely provides an exhaust system for exhaust air from the turbine. As another example, the power generation transport 102 may be implemented using a three-transport design in which a first transport may include a gas turbine, a second transport may include a generator, and a third transport may include an air handling system that provides filtered intake air for combustion by the turbine.

Although not shown in FIG. 1, the power generation transport 102 may include a variety of equipment for mobile electric power generation including a gas conditioning skid, a black start generator, a power source (e.g., gas turbine), a power source air inlet filter housing, a power source inlet plenum, a power source exhaust collector, an exhaust coupling member, a power source exhaust stack, a gearbox, a generator shaft, a generator, a generator air inlet filter housing, a generator ventilation outlet, a generator breaker, a transformer, a starter motor, and a control system. Other components on the power generation transport 102 may include a turbine lube oil system, a fire suppression system, a generator lube oil system, and the like.

In one embodiment, the power source may be a gas turbine. In another embodiment, power source may be another type of power source (e.g., diesel engine). The gas turbine may generate mechanical energy (e.g., rotation of a shaft) from a hydrocarbon fuel source, such as natural gas, liquefied natural gas, condensate, and/or other liquid fuels. For example, a shaft of the gas turbine may be connected to the gearbox and the generator such that the generator converts the supplied mechanical energy from the rotation of the shaft of the gas turbine to produce electric power. The gas turbine may be a commercially available gas turbine such as a General Electric NovaLT5 gas turbine, a Pratt and Whitney gas turbine, or any other similar gas turbine. The generator may be a commercially available generator such as a Brush generator, a WEG generator, or other similar generator configured to generate a compatible amount of electric power. For example, the combination of the gas turbine, the gearbox, and the generator within power generation transport 102 may generate electric power from a range of at least about 1 megawatt (MW) to about 60 MW (e.g., 5.6 MW, 32 MW, or 48 MW). Other types of gas turbine/generator combinations with power ranges greater than about 60 MW or less than about 1 MW may also be used depending on the application requirement.

In addition to the power generation transport 102, the mobile fracturing system 103 may include a switch gear transport 112, at least one blender transport 110, at least one data van 114, and one or more fracturing pump transports 108 that deliver fracturing fluid through the wellhead 101 to the subsurface geological formations. The switch gear transport 112 may receive electricity generated by the power generation transport 102 via one or more electrical connections. In one embodiment, the switch gear transport 112 may use 13.8 kilovolts (KV) electrical connections to receive power from the power generation transport 102. The switch gear transport 112 may transfer the electricity received from the power generation transport 102 to electrically connected fracturing equipment of the mobile fracturing system 103. The switch gear transport 112 may comprise a plurality of electrical disconnect switches, fuses, transformers, and/or circuit protectors to protect the fracturing equipment. In some embodiments, switch gear transport 112 may be configured to step down a voltage received from the power generation transport 102 to one or more lower voltages to power the fracturing equipment.

Each fracturing pump transport 108 may receive the electric power from the switch gear transport 112 to power a prime mover. The prime mover converts electric power to mechanical power for driving one or more fracturing pumps of the fracturing pump transport 108. In one embodiment, the prime mover may be a dual shaft electric motor that drives two different frac pumps mounted to each fracturing pump transport 108. Each fracturing pump transport 108 may be arranged such that one frac pump is coupled to opposite ends of the dual shaft electric motor and avoids coupling the pumps in series. By avoiding coupling the pump in series, fracturing pump transport 108 may continue to operate when either one of the pumps fails or has been removed from the fracturing pump transport 108. Additionally, repairs to the pumps may be performed without disconnecting the system manifolds that connect the fracturing pump transport 108 to other fracturing equipment within the mobile fracturing system 103 and the wellhead 101. The fracturing pump transport 108 may implement (in whole or in part) a system for predicting frac pump component life intervals and setting a continuous completion event for a well completion design.

The blender transport 110 may receive electric power fed through the switch gear transport 112 to power a plurality of electric blenders. A plurality of prime movers may drive one or more pumps that pump source fluid and blender additives (e.g., sand) into a blending tub, mix the source fluid and blender additives together to form fracturing fluid, and discharge the fracturing fluid to the fracturing pump transports 108. In one embodiment, the electric blender may be a dual configuration blender that comprises electric motors for the rotating machinery that are located on a single transport. In another embodiment, a plurality of enclosed mixer hoppers may be used to supply the proppants and additives into a plurality of blending tubs.

The data van 114 may be part of a control network system, where the data van 114 acts as a control center configured to monitor and provide operating instructions to remotely operate the blender transport 110, the power generation transport 102, the fracturing pump transports 108, and/or other fracturing equipment within the mobile fracturing system 103. For example, the data van 114 may implement (in whole or in part) the system for predicting frac pump component life intervals and setting a continuous completion event for a well completion operation. In one embodiment, the data van 114 may communicate with the variety of fracturing equipment using a control network system that has a ring topology (or star topology). A ring topology may reduce the amount of control cabling used for fracturing operations and increase the capacity and speed of data transfers and communication.

Other fracturing equipment shown in FIG. 1, such as fracturing liquid (e.g., water) tanks, chemical storage of chemical additives, hydration unit, sand conveyor, and sandbox storage are known by persons of ordinary skill in the art, and therefore are not discussed in further detail. In one or more embodiments of the mobile fracturing system 103, one or more of the other fracturing equipment shown in FIG. 1 may be configured to receive power generated from the power generation transport 102. The control network system for the mobile fracturing system 103 may remotely synchronize and/or slave the electric blender of the blender transport 110 with the electric motors of the fracturing pump transports 108.

Example Move Orchestration System Environment

Figure 2:
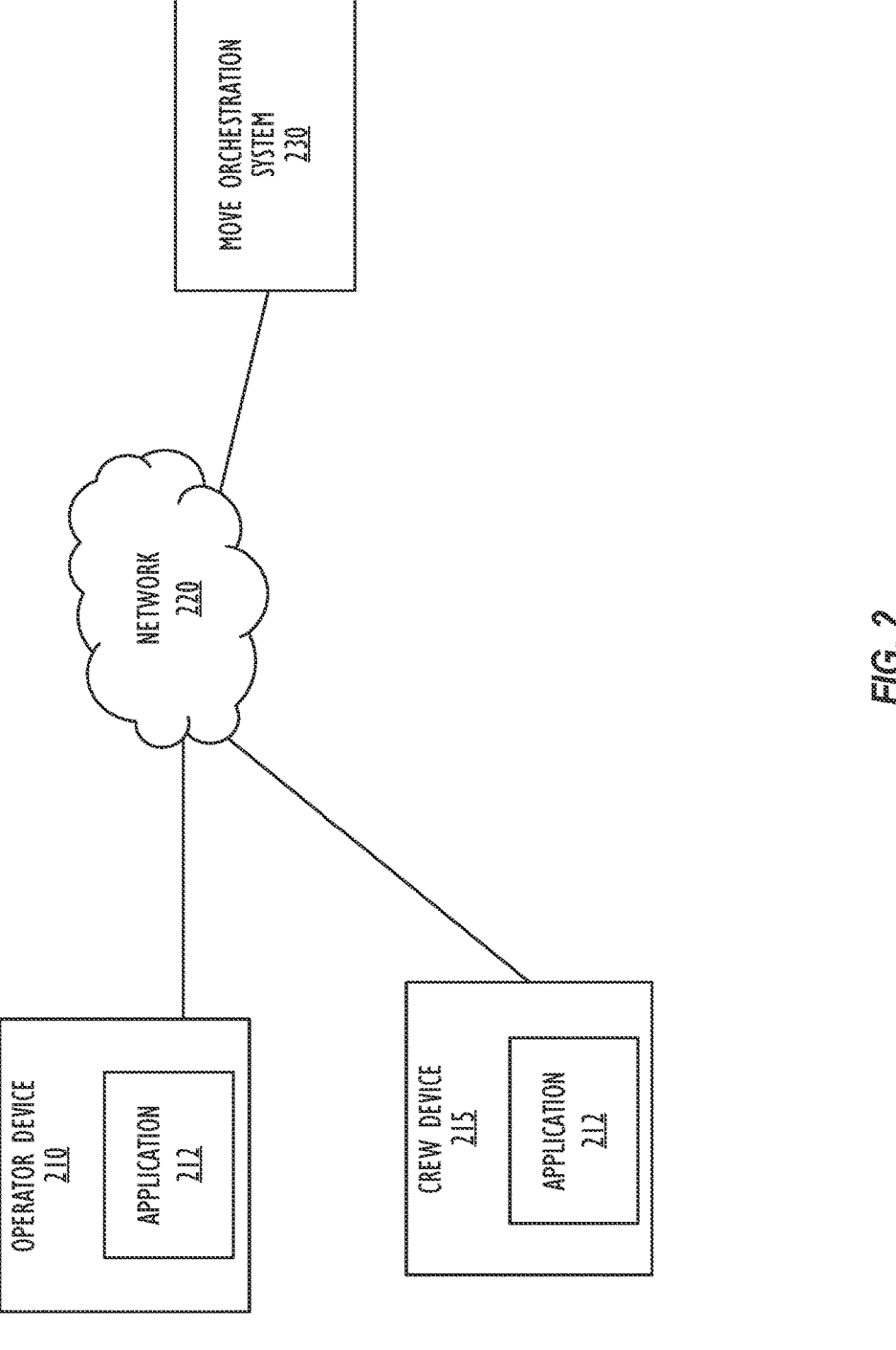
FIG. 2 is a block diagram of a move orchestration system environment configured to orchestrate fleet moves, in accordance with some embodiments.

FIG. 2 is a block diagram of a move orchestration system environment 200 configured to orchestrate fleet moves, in accordance with some embodiments. Environment 200 includes an operator device 210, a client device 215, communicatively coupled to a move orchestration system 230 through a network 220. The elements of environment 200 are exemplary only, and fewer, more, or different elements may be implemented without departing from the scope of the disclosure. For example, FIG. 2 illustrates one instance each of the operator device 210 and the client device 215. However, in actuality, the environment 200 will include multiple instances of each of the operator device 210 and the client device 215 all interacting with the move orchestration system 230 via the network 220. The environment 200 includes various client devices, such as operator device 210 and crew device 215. The term client device, as used herein, may refer to a computing device such as smartphones with an operating system such as ANDROID® or APPLE® IOS®, tablet computers, laptop computers, desktop computers, electronic interfaces in automobiles or other vehicles, or any other type of network-enabled device from which users (e.g., operators, crew members) can interact with the move orchestration system 230 to perform various operations related to fleet moves. Typical client devices include the hardware and software needed to input and output sound (e.g., speakers and microphone) and images, input or view data and information (e.g., via a touchscreen), connect to the network 220 (e.g., via Wi-Fi and/or 5G or other wireless telecommunication standards), determine the current geographic location of the client devices (e.g., a Global Positioning System (GPS) unit), and/or detect motion of the client devices (e.g., via motion sensors such as accelerometers and gyroscopes).

The operator device 210 is a device operated by an operator user with appropriate privileges to perform various tasks related to the move orchestration system 230. The operator device 210 may have application 212 installed thereon to manage the fleet move and send instructions related to executing the fleet move to crew devices 215. The application 212 may be a stand-alone application downloaded by a client device from the move orchestration system 230. Alternatively, the application 212 may be accessed by way of a browser installed on the client device, accessing an application instantiated from the move orchestration system 230 using the browser. In the case of a stand-alone application, browser functionality may be used by the application 212 to access certain features of move orchestration system 230 that are not downloaded to the client device. The application 212 may be used by the operator device 210 to use functions of the move orchestration system 230 for creating a new fleet move, inputting parameters for the fleet move, viewing the probability of the fleet move being completed on time as determined by the move orchestration system 230, viewing and accepting/rejecting recommendations generated by the move orchestration system 230, viewing crew member activity data logged using crew devices 215, viewing real-time status updates, e.g., as a Gantt chart, and the like. The operator user may be an administrator of the fleet move created using the application 212. More than one operator user may be an administrator of the fleet move.

The crew device 215 is operated by a crew member user (or by a representative of a group of crew members) who is tasked with performing activities related to one or more events of a prescribed move play for the fleet move. The crew device 215 may have the application 212 installed thereon. The application 212 may be used by the crew device 215 to access functions provided by the move orchestration system 230 for viewing a new fleet move created by an operator device 210, viewing the prescribed move play for the fleet move, viewing real-time status updates, e.g., as a Gantt chart, and the like, generated based on crew member activity data logged into the application 212 by various crew devices 215.

In addition, the application 212 may be used by the crew device 215 for receiving notifications or instructions regarding one or more events of the move play for which activities are to be performed by the crew member user associated with the particular crew device 215. For these assigned events to be performed by the particular crew device's 215 crew member user, the application 212 may provide additional information for each event (e.g., start time, end time, prescribed duration, specific tasks to be performed, etc.) based on which the crew member user working at the well site may what tasks need to be performed by them, when the tasks need to be performed, how much time the crew member has to perform each task, and the like. The application 212 may also enable the crew member user to log activity data for each assigned event based on actual conditions when performed activities associated with each event. For example, a crew member may be unable to start a particular activity on time as prescribed by the move plan due to any number of reasons (e.g., a blocking activity or dependency which is preventing the current crew member from performing their task). The application 212 thus enables the user to log activity data based on actual conditions (e.g., log actual time when the activity was started or completed, etc.) when the respective activities are performed.

Further, during the move, if an update to the move play is made based on input from the operator user, the application 212 on the crew member's device 215 may receive notifications or instructions regarding one or more events of the updated move play for which activities are to be performed by the crew member user associated with the particular crew device 215. The crew member may thus be made aware of their newly assigned tasks based on the updated move play, and also access additional information for each event (e.g., updated start time, updated end time, reduced duration, specific tasks to be performed, etc.) based on the updated move play.

The operator device 210 and the crew member device 215 access the move orchestration system 230 through the network 220. Network 220 is typically the Internet, but may be any network, including but not limited to a Local Area Network (LAN), a Metropolitan Area Network (MAN), a Wide Area Network (WAN), a mobile wired or wireless network, a private network, or a virtual private network.

The move orchestration system 230 provides the application 212 to client devices (e.g., operator device 210, crew device 215), and additionally provides functionality connected to fleet moves, including creation, management, assignments, real-time tracking and analytics, on-time prediction, change recommendation, storage, and so on. While the move orchestration system 230 is depicted as a single entity, the move orchestration system 230 may be implemented through functionality spread across and/or replicated across a plurality of servers. Moreover, some or all of the functionality of the move orchestration system 230 may be integrated into application 212 for on-board processing at a client device. Further details of the move orchestration system 230 are discussed below with respect to FIG. 3.

Example Move Orchestration System

Figure 3:
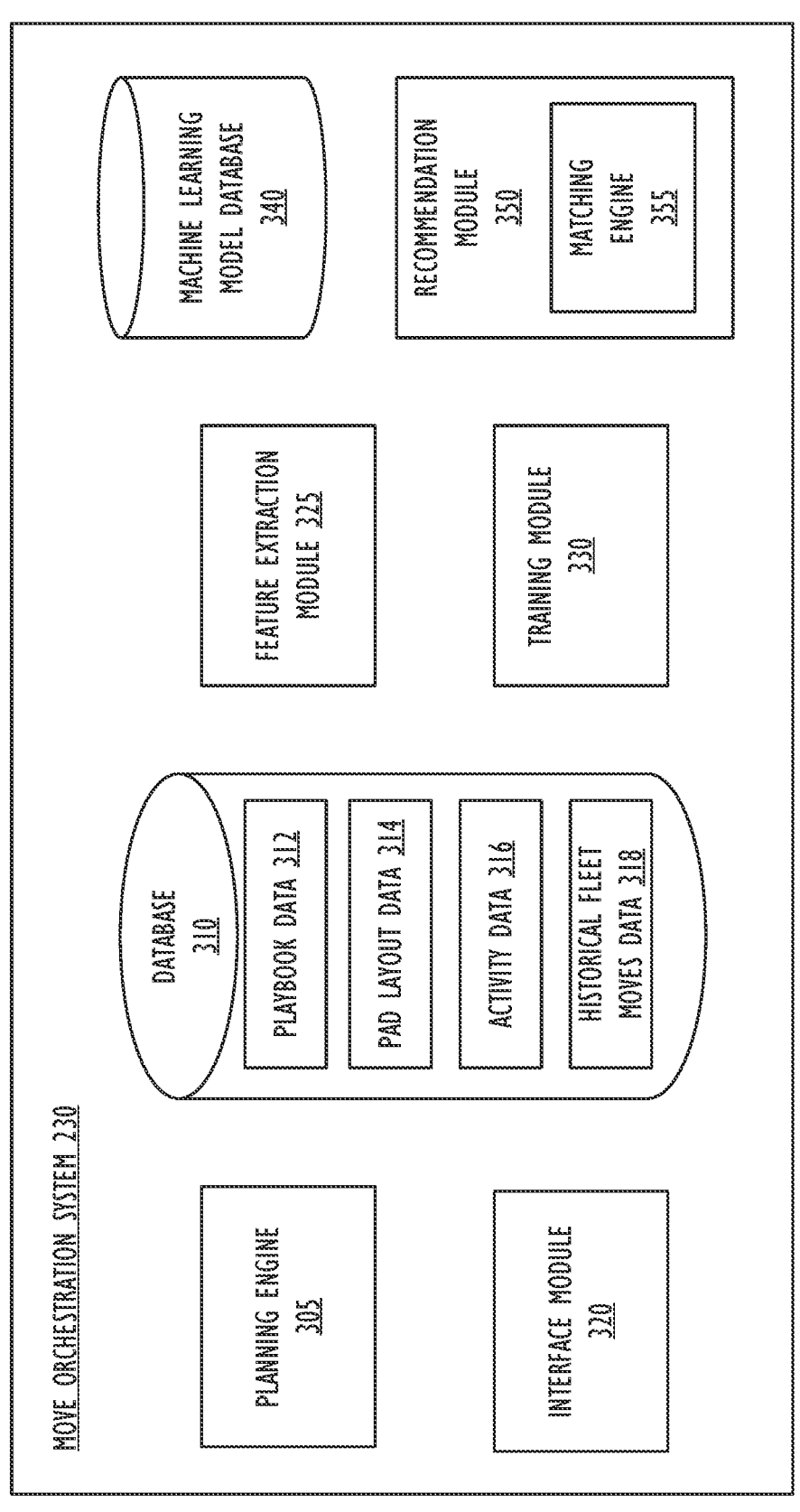
FIG. 3 is a block diagram of a move orchestration system of the environment of FIG. 2, in accordance with some embodiments.

FIG. 3 is a block diagram of the move orchestration system 230 of FIG. 2, in accordance with some embodiments. The move orchestration system 230 provides functionality to create fleet moves, assign activities for the fleet moves to crew members, track progress of the fleet moves and of the individual assigned activities in real-time, and present the current status of the move and individual activities to users on a user interface (e.g., as a Gantt chart). The move orchestration system 230 further provides functionality to analytically identify a move play that is best suited for a current fleet move based on input parameters for the fleet move such as origin and destination pad layout or design, number and type of equipment or components of the frac fleet, and the like. The move orchestration system 230 further includes functionality to predict, after the move has started, whether the fleet move with the prescribed move play will complete successfully within the planned timeframe and make automatically identify recommended modifications to the move play in response to predicting that the fleet move with the prescribed move play will fail to complete within the planned timeframe. The recommended modifications may provide insights to the operator on how to improve the likelihood of the fleet move completing successfully within the planned timeframe or at least to minimize delay or overtime. The move orchestration system 230 uses machine learning models that are trained based on features and performance of historical fleet moves that were previously managed by the move orchestration system 230. The historical fleet moves include moves associated with a particular fracturing fleet whose past fleet moves have been managed by the move orchestration system 230. The historical fleet moves may further include moves associated with other fracturing fleets whose past fleet moves have also been managed by the move orchestration system 230. Among other benefits, the move orchestration system 230 can determine customized modifications to the move play that is prescribed for the fleet move to improve the likelihood of the move coming back "on-track" after it is determined (e.g., based on the prediction) that the move has gone "off-track" (e.g., unlikely to complete within the allotted time period).

The move orchestration system 230 includes a planning engine 305, a database 310, an interface module 320, a feature extraction module 325, a training module 330, a machine learning model database 340, and a recommendation module 350. The datastore 310 may include playbook data 312, pad layout data 314, activity data 316, and historical fleet moves data 318. The recommendation module 350 may include a matching engine 355. The modules, engines, and databases illustrated in FIG. 3 are merely exemplary; fewer or more modules, engines, or databases may be used to achieve the functionality described herein. Moreover, while described below as implemented within the move orchestration system 230, some or all of the components described herein may be implemented on a client device (e.g., as modules running within application 212, as databases stored in memory on a client device, etc.).

The planning engine 305 prescribes a move play for a fleet move based on parameters for the fleet move input by an operator associated with the operator device 210. The move play may be analytically selected by the planning engine 305 from among a plurality of predefined move plays stored as playbook data 312 in the database 310. Each move play includes instructions orchestrating performance of activities for a plurality of events for the fleet move.

FIG. 4 illustrates a plurality of events 400, some or all of which may be included in a move play. The events 400 illustrated in FIG. 4 are exemplary in nature only and not intended to be limiting. In some embodiments, move plays may be predesigned using one or more events other than or in addition to the exemplary events 400 shown in FIG. 4. Also, a given defined move play may not include all of the events 400 illustrated in FIG. 4. The example shown in FIG. 4 illustrates 46 different types of events for some or all of which activities may need to be performed by crew members during a particular fleet move (based on the move play prescribed for the move). The application 212 may be configured to accept activity data (e.g., event start time, event end time, etc.) as input from the client device for some or all of the events 400 of FIG. 4. As shown in FIG. 4, the events may include rig down (RD) events (e.g., events 7-16) during which equipment of the frac fleet (e.g., fleet shown in FIG. 1) is disassembled at a first well site or frac pad; transit (T) events (e.g., events 17-35) during which the disassembled equipment is in transit to a second well site or frac pad; and rig up (RU) events (e.g., events 36-46) during which the equipment of the frac fleet s reassembled at the second well site to begin hydraulic fracing. In general, the events 400 are defined as activity-equipment combinations, such as RD-Blender, T-Manifold, or RU-Datavan. The events 400 also include additional events such as maintenance events, testing events, and the like.

Some of the events 400 may have dependencies or blocking events. For example, one example of blocking events is the natural order of operations that must happen between rig down, transit, and rig up operations for an individual piece of equipment (e.g., the blender trailer must be rigged down before it can be transported, and the blender trailer must be transported before it can be rigged back up). Other non-limiting examples of blocking events or events having dependencies are: (A) Event 38—RU-Cables—Megger-meg testing. Event 38 must be completed before Event 46 RU-Switchgear can be started; (B) Event 37—RU-Cables Grounding, and Event 42—RU-Ground Field Certification. Events 37 and 42 must be completed before Event 5—PO—GT 13.8 can be started (i.e., cables must be grounded and certified before power can be sent out from the gas turbine); (C) all rig up events must be completed before Event 6—PU—Prime Up Pressure Test can begin; and (D) Event 41—RU—EVO Gas Conditioning Skid needs to be complete before Event 5—PO-GT 13.8 can be started.

The planning engine 305 may be configured to accept as input from the operator device 210, parameters for a fleet move being created by the operator. The parameters may include information regarding the pad layout or design the fleet is moving from, and information regarding the pad layout or design the fleet is moving to. In some embodiments, visual representations of a plurality of different pad layouts may be predefined and stored in the database 310 as pad layout data 314. The operator associated with the operator device 210 may then simply interact with the application 212 on the device 210 to select a particular pad layout from a list of available predefined pad layouts 314 that best corresponds to the pad layout of the wellsite the fleet is moving from and select a particular pad layout from the list of predefined layouts that best corresponds to the pad layout of the wellsite the fleet is moving to. In some embodiments, the operator may enter information regarding the origin and destination pad layouts manually. The pad layout information may include information regarding site entrance location, gas inlet location (e.g., fuel source for power generation), sand equipment type (e.g., silos, boxes, etc.), water type (e.g., working tanks, large storage tank, on-the-fly, etc.), pre-existing wells on pad, well heads orientation and location, total fleet equipment needed on site, 3rd party equipment needed on site (e.g., wireline, flowback, etc.). Further, the parameters input by the operator when creating a new fleet move may include additional parameters. Examples of the additional parameters include information regarding the frac fleet to be moved (e.g., number and type of components, total loads), information regarding ancillary equipment needed for the origin and destination frac pads, origin and destination site layouts (for trucking assignment order of loads) including gas entry point and existing wells, if any, truck route (includes permitted and off limit roads), key personnel (for crew and task assignments), including grouping of personnel, 3rd party vendors and systems (e.g., box system vs. silos, pneumatic or elevator loads), and pre-rig up (leap-frogged) items.

Based on the input parameters (e.g., based on the input origin and destination pad layouts), the planning engine 305 may select a predefined move play from among a plurality of predefined move plays included in the playbook data 312. That is, the plurality of predefined move plays included in the playbook data 312 may be predefined and each play may include pertinent step-wise information for carrying out the move in a predetermined amount of time. Each move play may be designed to optimize for the amount of time it takes complete the move and may be applicable based on parameters of the move, like the origin and destination pad layouts.

Figure 5A:
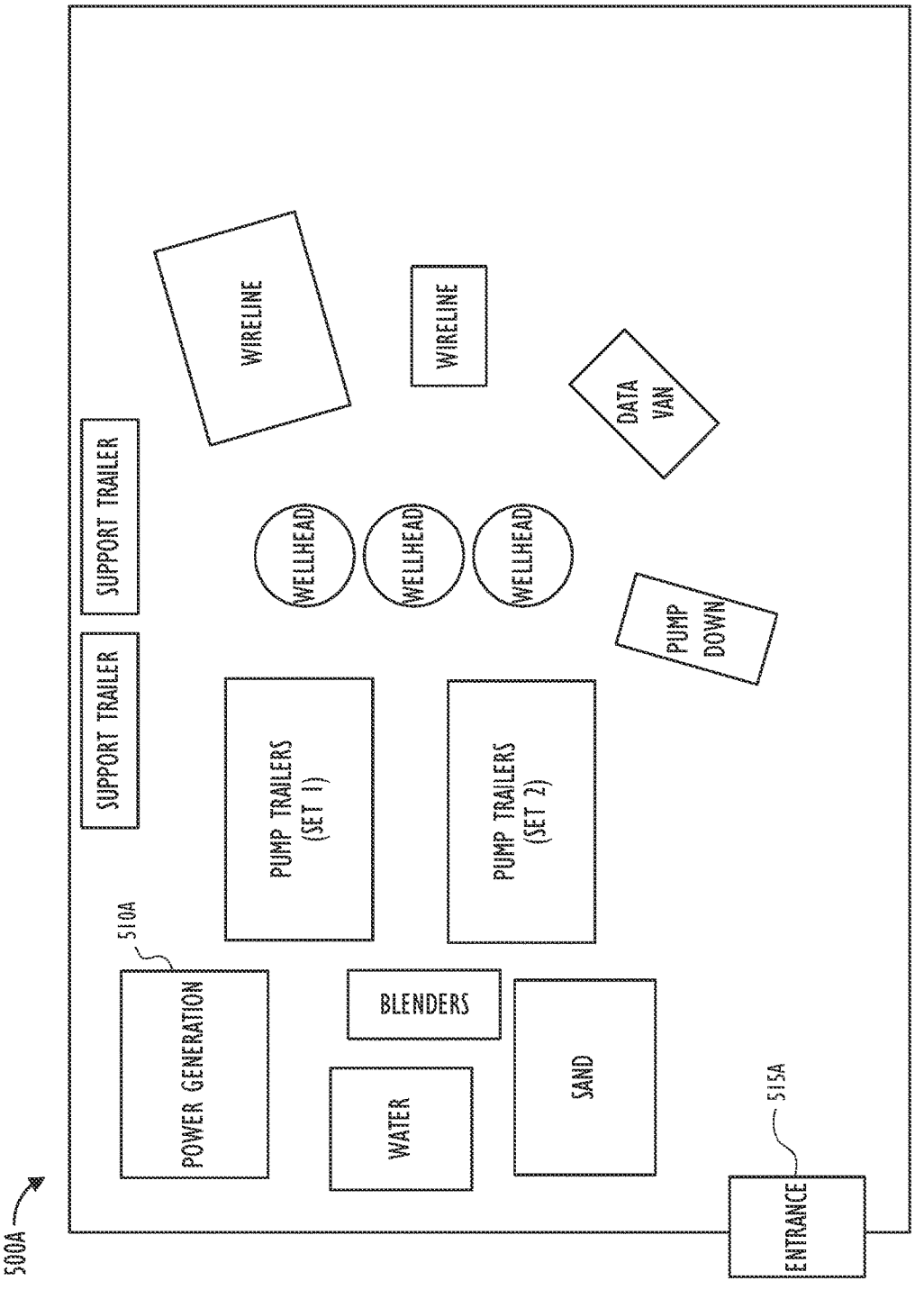
FIGS. 5A-5B illustrate exemplary frac pad layouts based on which the move orchestration system may prescribe a particular move play for the fleet move, in accordance with some embodiments.
Figure 5B:
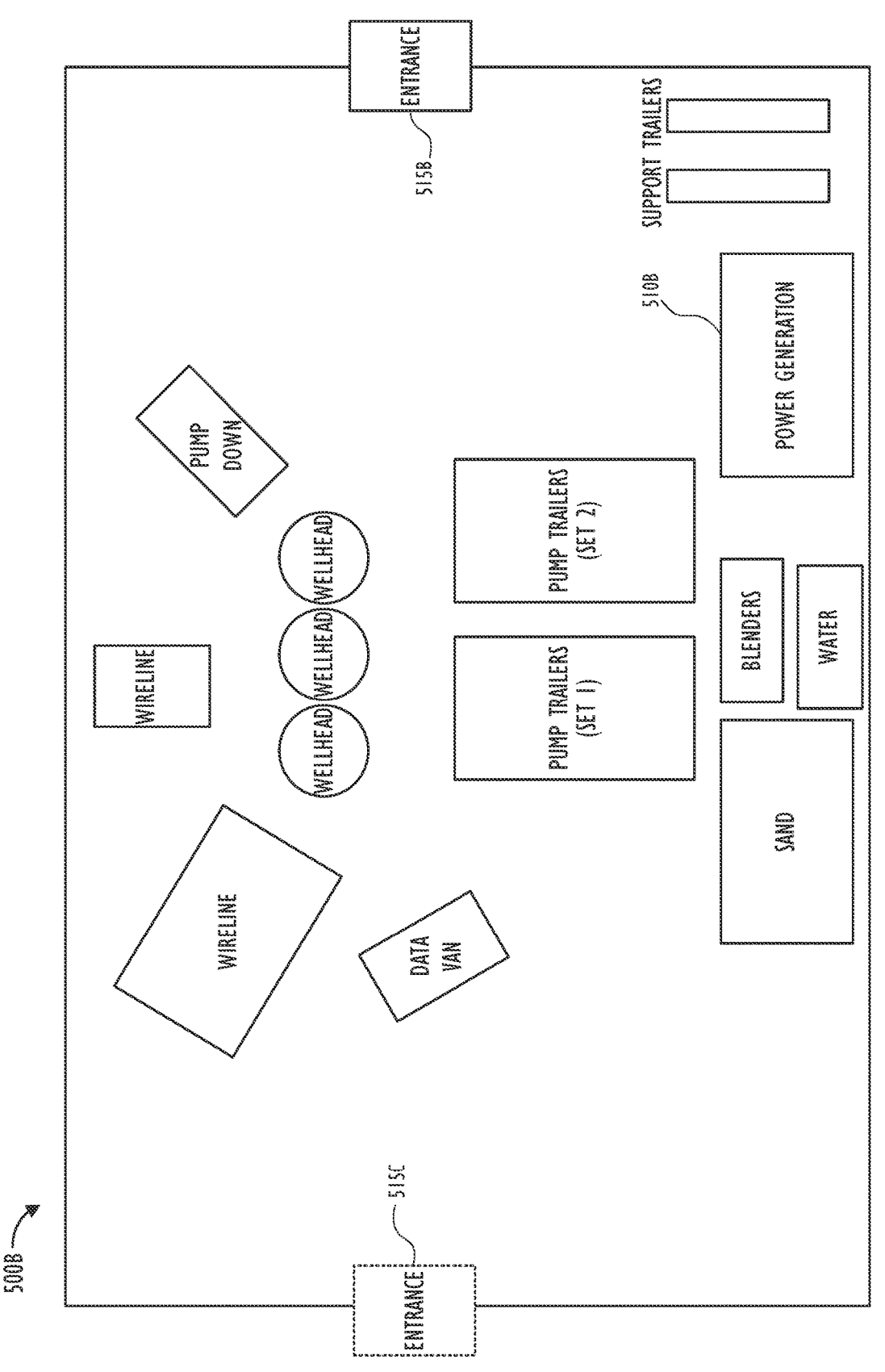

The planning engine 305 may be a rule-based engine that applies predefined rules (e.g., series of if-then rules) to select a particular move play (e.g., a move plan formula) that best fits the given specifics of the fleet move defined by the input parameters. The move play selection process performed by the planning engine 305 based on input parameters is described in further detail below with an example corresponding to FIGS. 5A-5B and 6. FIG. 5A illustrates a first exemplary frac pad layout 500A and FIG. 5B illustrates a second exemplary frac pad layout 500B. For example, an operator may interact with the application 212 on the operator device 210 to create a new move for moving a hydraulic fracturing fleet for performing hydraulic fracturing operations from a first frac pad to a second frac pad. Further, components of the hydraulic fracturing fleet arranged at the first frac pad may be determined to best match the layout 500A and the components of the hydraulic fracturing fleet to be arranged at the second frac pad may be determined to best match the layout 500B. In this case, the operator may interact with the application 212 to select the predefined layout 500A as the origin pad layout and select the predefined layout 500B as the destination pad layout. Based on the input layouts 500A and 500B, the planning engine 305 may, for example, identify the predefined move play 600 of FIG. 6 from among a plurality of predefined move plays stored in the playbook data 312 as the prescribed move play based on which the performance of activities for the fleet move is to be orchestrated.

As shown in the example move play 600 of FIG. 6, the total time duration (e.g., predetermined timeframe, allotted timeframe) for the prescribed move is 32 hours. That is, based on the input parameters, the planning engine 305 has selected the predefined move play 600 from the playbook data 312 as a move play that satisfies the input parameters for the fleet move and the selected move play 600 has a time duration from the first event 605 ("Close Well") to the last event 610 ("Open Well") of 32 hours. For ease of illustration, FIG. 6 illustrates a simplified version of a move play as the move play 600 in which transit events are left out. In actuality, the move play 600 will include additional intervening events (e.g., one or more of the transit events shown in FIG. 4), and each play in the playbook 312 has more detailed instructions on each time block as well as more information around preparation and execution (e.g., the play may include codes used for different job types). As shown in FIG. 6, the move play 600 includes plurality of rig down events 615 and a plurality of rig up events 620. Based on the start time and end time 630, the play 600 also defines an order for performance of activities related to the plurality of events and defines the user group 640 assigned for performance of activities related to each event. Each user group 640 may include one or more crew members or hands that are assigned to perform activities for the corresponding event and during the corresponding start time to end time 630.

In the example move play selection described above with respect to FIGS. 5 and 6, at the origin frac pad having the layout 500A, the power generation position 510A (e.g., position of the power generation transport 102 of FIG. 1) is away from the entrance 515A, and as a result, the power generation components of the fleet will be loaded for transit close to last during the fleet move. And at the destination frac pad having the layout 500B, the power generation position 510B is situated close to the entrance 515B (which means the power generation transit event needs to happen close to the end). Based on such analysis, the (rule-based) planning engine 305 will select move play 600 of FIG. 6 which is designed such that the transit event for the power generation happens close to the end of the play (before rig up events; not shown in FIG. 6). However, if, for example, the entrance 515B in destination pad layout 500B was on the other side (entrance 515C), the (rule-based) planning engine 305 will select a different move play where the transit event for the power generation happens close to the beginning of the play (after rig down events). As is evident from the above, the order of events (e.g., transit events) in a particular play determine which rig up event activities can begin. If in the above example, where the entrance 515C was on the other side, the power generation turbine would need to get in first and hold up the other equipment coming on the destination pad. The play selected by the planning engine in such a scenario will be designed to be the most efficient possible but may be closer to 36 hours due to the added complexity and order of operations.

Returning to FIG. 3, the interface module 320 may enable interaction between instances of the application 212 on the client devices and the move orchestration system 230. For example, the interface module 320 may enable receipt of the input parameters when the operator associated with the operator device 210 interacts with the application 212 to create a new fleet move and input corresponding move parameters (e.g., selecting origin and destination pad layouts). As another example, the interface module 320 may present the move play prescribed by the planning engine 305 to the operator associated with the operator device 210 via the application and obtain confirmation from the operator that the prescribed move play is acceptable. As another example, the interface module 320 may present event assignments per the prescribed move play to respective crew member devices for the respective assigned crew members (or user groups) to begin performing activities related to the fleet move based on the instructions included in the move play. As yet another example, the interface module 320 may detect that activity data associated with a fleet move has been received from respective one or more crew member devices 215. That is, when the respective assigned crew members (or user groups) begin performing activities related to the fleet move based on their respective assigned events and corresponding instructions included in the prescribed move play, the crew members may operate respective crew devices 215 to log activity data (e.g., event start time, event end time, etc.) associated with performance of activities corresponding to the events. The logged activity data from different crew devices 215 may be received by the interface module 320 and stored in the database 310 as the activity data 316. In some embodiments, the activity data 316 may automatically be updated each time new activity data related to one or more events is received from one or more devices 215.

Based on the activity data 316 received in real-time as the events per the move play are completed by the respective user groups, the interface module 320 may generate a tracking interface to show real-time status updates corresponding to the fleet move and for each event prescribed for the fleet move. That is, the activity data 316 enables events and corresponding activities to be tracked as they happen. Further, unlike conventional systems that force a linear approach to data capture, the move orchestration system 230 allows simultaneous activity data 316 capture for many individual processes that are being performed in parallel by corresponding user groups while also ensuring blocked events are performed after corresponding blocking events per the prescribed move play are completed. The activity data 316 may include (actual) start time and (actual) end time for each individual event per the prescribed move play (e.g., each of the events of the move play in FIG. 6), activity assignments to specific crew members, number of personnel involved in each process, live notes on process execution, and the like.

Figure 7:
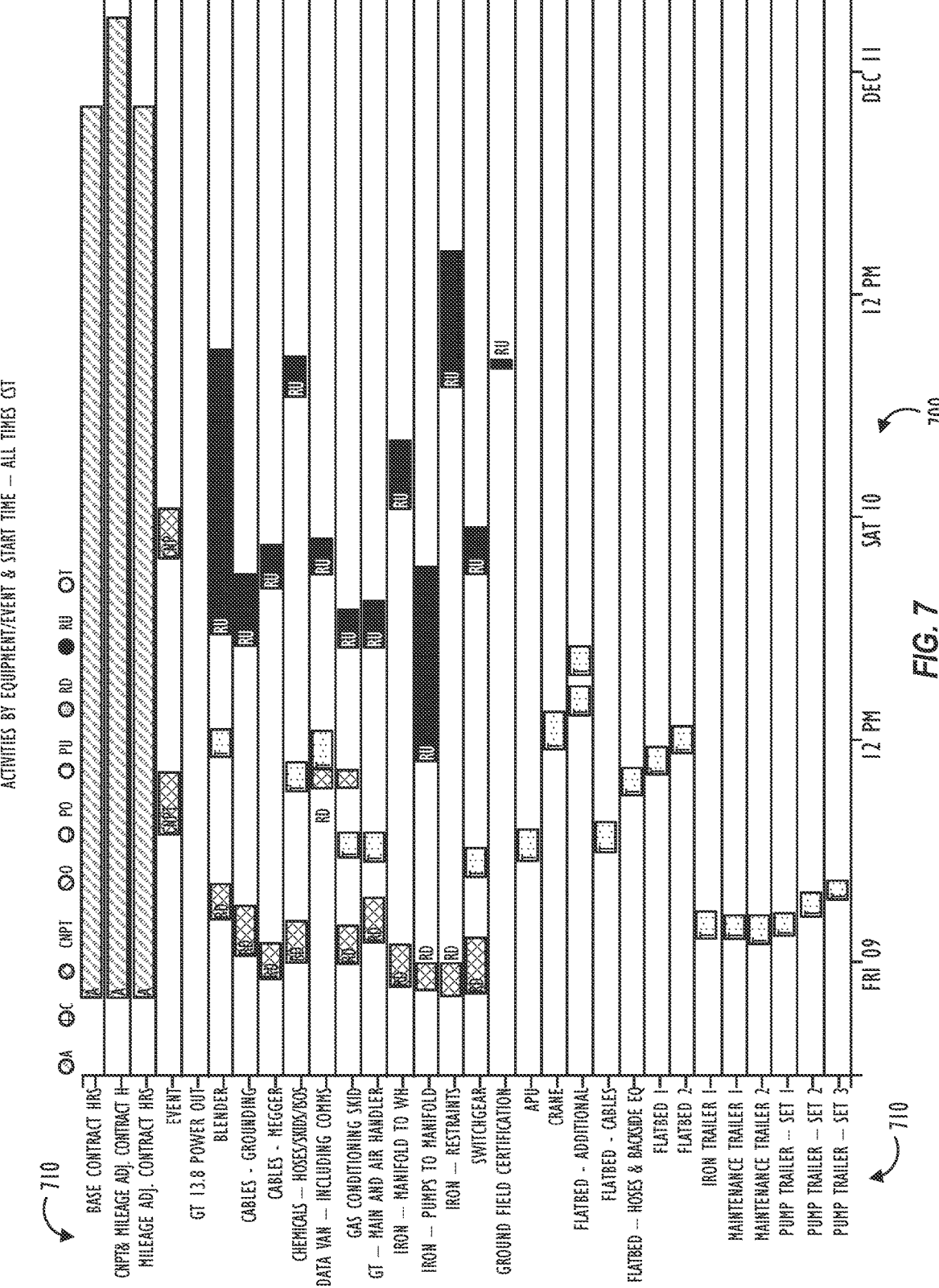
FIG. 7 illustrates an exemplary user interface showing a Gantt chart of a fleet move that has completed, in accordance with some embodiments.

The tracked activity data 316 may be presented for consumption by the users of the client devices in any suitable format. For example, the interface module 320 may be configured to generate an interface 700 as shown in FIG. 7, based on the activity data 316 received from the client devices, and continuously update the interface 700 in real-time as activities corresponding to events per the move play happen and corresponding activity data 316 is logged by the responsible crew members in the client devices and the data is received by the interface module 320. The exemplary interface 700 in FIG. 7 is a Gantt chart that shows a status of a completed actual move where actual start and end times for various events 710 (e.g., RU events, T events, and RU events) associated with the move are presented as bars on a timeline. The multi-level interface 700 provides operators and crew members real-time monitoring capability that consolidates all activities and events of the move play into a single easily digestible view. The interface module 320 further interacts with the application 212 on the client devices to cause a graphical user interface associated with the application to display the generated interface 700 on the client devices based on user operation.

Returning to FIG. 3, the feature extraction module 325 extracts features associated with the activity data 316. After the interface module 320 detects that activity data 316 from one or more crew member devices 215 has been received, the feature extraction module 325 determines features or attributes associated with the detected activity data 316. In some embodiments, the feature extraction module 325 determines the features or attributes when certain thresholds with respect to the received activity data 316 are met. For example, the feature extraction module 325 determines the features or attributes when the activity data 316 indicating completion of predetermined one or more events is received (e.g., data 316 indicating completion of all rig down events per the move play, data 316 indicating completion of a predetermined subset of events per the move play, etc.). The features may include the type of event, (actual) start time of the event, (actual) end time of the event, dependencies of the event (e.g., blocking events), crew members assigned to the event, and the like. The features may also include attributes related to the move play prescribed for the fleet move like events that have been completed, outstanding events per the move play (e.g., events still to be performed), dependencies for the outstanding events, the start time of each event per the move play, the end time of each event per the move play, the total allotted time per the move play for the fleet move (e.g., the predetermined timeframe) and the like.

The training module 330 trains one or more machine learning models stored in machine learning model database 340 to output probabilities corresponding to a potential failure of the fleet move having the prescribed move play completing within the predetermined timeframe, based on input of extracted features associated with the fleet move (activity data 316). The machine learning models may be supervised or unsupervised models. For supervised learning, training data may include features of historical activity data of historical fleet moves from the historical fleet move data 318 stored in the database 310. Based on performance of the historical fleet moves, the machine learning models may learn patterns in the activity data to output a probability of the fleet move having the prescribed move play failing to complete within the predetermined timeframe (e.g., 30% probability that the fleet move is completed (close well event to open well event) per the prescribed move play within 32 hours prescribed by the move play) based on input of features from the feature extraction module 325. The machine learning may also output probabilities of the fleet move having the prescribed move play failing to complete within the predetermined timeframe based on specific features associated with the fleet move. For example, the machine learning models may output a probability of the fleet move having the prescribed move play failing to complete within the predetermined timeframe because the amount of time it took to complete predetermined events (e.g., one or more rig down events) is more than corresponding allotted time by a threshold amount.

The historical fleet moves data 318 includes data of past completed fleet moves, including fleet moves that were completed within the corresponding allotted timeframe and fleet moves that were not completed within the corresponding allotted timeframe. A subset of the historical fleet moves in the historical fleet moves database 318 may be selected to be used as training data for the machine learning models in the machine learning model database 340. For each of the historical fleet moves, the historical fleet moves database 318 may store information such as the features associated with the historical activity data of events per the prescribed move play associated with the historical fleet move (e.g., where the features are taken in a pair with corresponding allotted time duration per the move play and the actual time duration for completion of the associated activity as logged in the application by the crew members and used as labels to form each sample of training data). As described in detail above with respect to the feature extraction module 325, features of a historical fleet move may include the events per the move play performed for the fleet move, the type of each event, actual and allotted start time of each event, actual and allotted end time of each event, dependencies of each event (e.g., blocking events), crew members assigned to each event, total actual time for the fleet move, total allotted time per the move play for the fleet move, and the like.

The machine learning model database 340 stores one or more machine learning models trained using the training module 330. The one or more machine learning models may be implemented using a variety of types of machine-learned models or trainable networks. For example, the one or more machine learning models may be a neural network, decision tree, or other type of computer model, and any combination thereof. In some embodiments, one or more machine learning models may be configured to determine a different probability. For example, a first machine learning model may be configured to determine a probability of the fleet move having the prescribed move play failing to complete within a predetermined timeframe (e.g., after completion of rig down events and before or while the transit events and rig up events are performed, determining the probability of whether the fleet move will be completed within the time prescribed by the move play), and a second machine learning model may be configured to determine a probability of a particular event (e.g., customer NPT) taking longer than a threshold amount of time (e.g., in a situation where the move cannot continue due to 3rd party-induced downtime, determining the probability of such downtime being longer than, e.g., 3 hours). In some embodiments, multiple machine learning models may operate in parallel to identify other variations of probabilities. In an embodiment, a single machine learning model (e.g., a multi-task machine learning model) may be trained to output multiple probabilities, each corresponding to different variations of probabilities.

Further, one or more machine learning models may be configured to determine probability based on different sets of data. For example, one machine learning model may be trained using the rig down data of the historical fleet moves, and another machine learning model may be trained using the transit data and rig up data, in addition to the rig down data of the historical fleet moves. The machine learning models thus enable continuously generating predictions based on real-time move activity data 316. That is, as activities of the fleet move are being performed, and as additional activity data becomes available, the model continuously (e.g., periodically or based on predetermined triggering events corresponding to the activity data) outputs the predictions in real-time based on the activity data available up to the point in time at which the prediction is made to determine whether the move will be completed on time (e.g., within the timeframe dictated by the move play). As additional datapoints are input to the models (based on additional received activity data), the likelihood of an accurate prediction is increased. Thus, for example, the models may output a first probability upon completion of some of the rig down events of the fleet move according to the prescribed move play. And as additional events (e.g., all of the rig down events, one or more transit events, one or more rig up events) of the fleet move according to the prescribed move play are completed, the models may output additional respective probabilities indicating the likelihood of the fleet move failing to complete within the predetermined timeframe prescribed by the move play.

In effect, in making the prediction, the models determine how well the current move (as evidenced by the activity data) is adhering to the move play prescribed by the planning engine 305. That is, based on the way that the move is going, the models analyze the activity data to determine if the move is "off track" as compared to the move play and has thus deviated from the move play. Based on the determination, the models will output the probability that the move in progress will fail meet operational and/or customer expectations in the form of a final duration as prescribed by the move play (e.g., predetermined timeframe). For example, in a move from Pad A to Pad B, the selected move play prescribes that it should take 36 hours to complete the move (given all the parameters into to the planning engine 305 for Pad A, Pad B, the fleet to be moved, the distance between the two pads, and so on). After 12 hours have elapsed for the move, the models evaluate all activity data 316 from the move thus far and returns a prediction as to whether it expects the move to come in under, on, or over the 36-hour mark.

The recommendation module 350 generates one or more recommendations configured to improve a likelihood of the fleet move being completed within the predetermined timeframe based on the probability output from the machine learned models. In some embodiments, the recommendation module 350 may generate the recommendations if the probability output from the machine learning models is higher than a threshold (e.g., 80% or higher probability that the fleet move having the prescribed move play will fail to complete within the predetermined timeframe (as determined based on the current activity data 316 at the time when the probability is calculated)). In some embodiments, instead of generating recommendations that improve a likelihood of the fleet move being completed within the predetermined timeframe, the recommendation engine 350 may generate one or more recommendations that will improve a likelihood of the fleet move being completed with minimal overtime that is over the prescribed allotted timeframe per the move play prescribed by the planning engine 305 (e.g., overtime less than a threshold). The interface module 320 may further interact with the application 212 on the operator devices 210 to cause a graphical user interface associated with the application to display the one or more recommendations.

If the machine learning models output a high failure probability (e.g., higher than threshold; indicating move is "slow" and/or "off-track"), the recommendation module 350 may map out all remaining move events per the prescribed move play such that move can be completed with the predetermined timeframe for the move. Further, if the recommendation module 350 determines that even if the generated recommendations were implemented, the failure probability output from the models for the updated move play still remains higher than the threshold, the recommendation module 350 generates recommendations that will minimizes overall delays (e.g., less than threshold delay).

The recommendation module 350 may generate the recommendations using the matching engine 355. For example, the matching engine 355 may identify a subset of the historical fleet moves whose historical activity data 318 is determined to match the activity data 316 associated with the fleet move within a predetermined threshold. The matching engine 355 may then access, from the matching historical activity data, outstanding event historical activity data associated with performance of activities for events that correspond to one or more outstanding events associated with the prescribed move play for the fleet move. For example, if rig down events of the current move are completed and based on the activity data of the RD events, the system determines the high failure probability, the matching engine 355 may identify from the historical moves, matching moves whose historical RD event activity data is the most similar to the RD event activity data of the current move (e.g., identify similar historical moves with a similar fleet components and similar move play, where RD events took similar amount of time as current fleet move RD events) and that were successfully completed with the allotted timeframe. For the identified successful matching historical moves, the system may then analyze the historical T and RU event activity data and identify features for the current fleet move's upcoming T and RU events, such that when the events are performed per the identified features, they will generate activity data that will match the historical T and RU event activity data of the successful matching historical moves. The matching engine 355 may thus generate the one or more recommendations based on the outstanding event historical activity data (e.g., historical T and RU event activity data in the example above).

Based on the identified features of the historical matching successful moves, the recommendation module 350 may generate recommendations that involve modifying one or more outstanding events of the current prescribed move play or suggest alternate move plays for the remainder of the current move. For example, the one or more recommendations may include recommending a determined reduction in a time duration for completing at least one outstanding event of the prescribed move play for the fleet move (e.g., change allotted time for a particular event per the move play from 2 hours to 1 hour and 45 mins).

As another example, the one or more recommendations may include recommending at least one of an updated start time and an updated end time for performing at least one outstanding event of the prescribed move play for the fleet move (e.g., keep a start time for a particular event per the move play the same at Hour 2 and change the end time for the particular event from hour 4 to hour 3:45). As another example, the one or more recommendations may include recommending a modification to a user group assigned to perform at least one outstanding event of the prescribed move play prescribed for the fleet move (e.g., change a number of groups or a number of crew members in the group to assign additional manpower to complete a particular event more quickly, and also change corresponding start time and end time for the event). As another example, the one or more recommendations may include recommending a revised order for completing two or more outstanding events of the prescribed move play for the fleet move. For example, suppose a user group is to complete a first task and then complete a second task (that is not dependent on completion of the first task. If the first task cannot be performed at the moment because of a blocking event (i.e., first task is dependent on another task being completed first), the revised order may instruct the user group to switch the order of performance of the first and second tasks such that the second is completed by the user group and then the first task is completed. The recommendation, if accepted, may also trigger change to the corresponding start time and end time for the switched events. As another example, the one or more recommendations may include recommending an alternate move play for the remainder of the current fleet move. For example, based on the historical matching activity data identified by the matching engine 355, the recommendation module 350 may determine that performing activities based on events of an alternate move play stored in the playbook database 312 may increase the likelihood of the fleet move being completed within the predetermined timeframe or at least to minimize the delay beyond the expiration of the allotted timeframe. And in this case, the applicable remainder of the events of the alternate move play may be recommended as the one or more recommendations.

In effect, the recommendation module 350 provides a recommendation to update the move play by specifying exactly how and when individual remaining activities for the move should be completed. The recommendation may re-align and coordinate all remaining move events within the current prescribed move play or suggest an alternate move play that is determined to be a more efficient completion based on the present conditions. In some embodiments, the recommendation may also be a customized move play (as opposed to a predefined move play in the playbook database 312) generated by the recommendation module 350 based on the matching operation by the matching engine 355. The customized move play may be algorithmically designed as a customized series of remaining move activities that are calculated and prescribed to the operations team in real-time.

Figure 8:
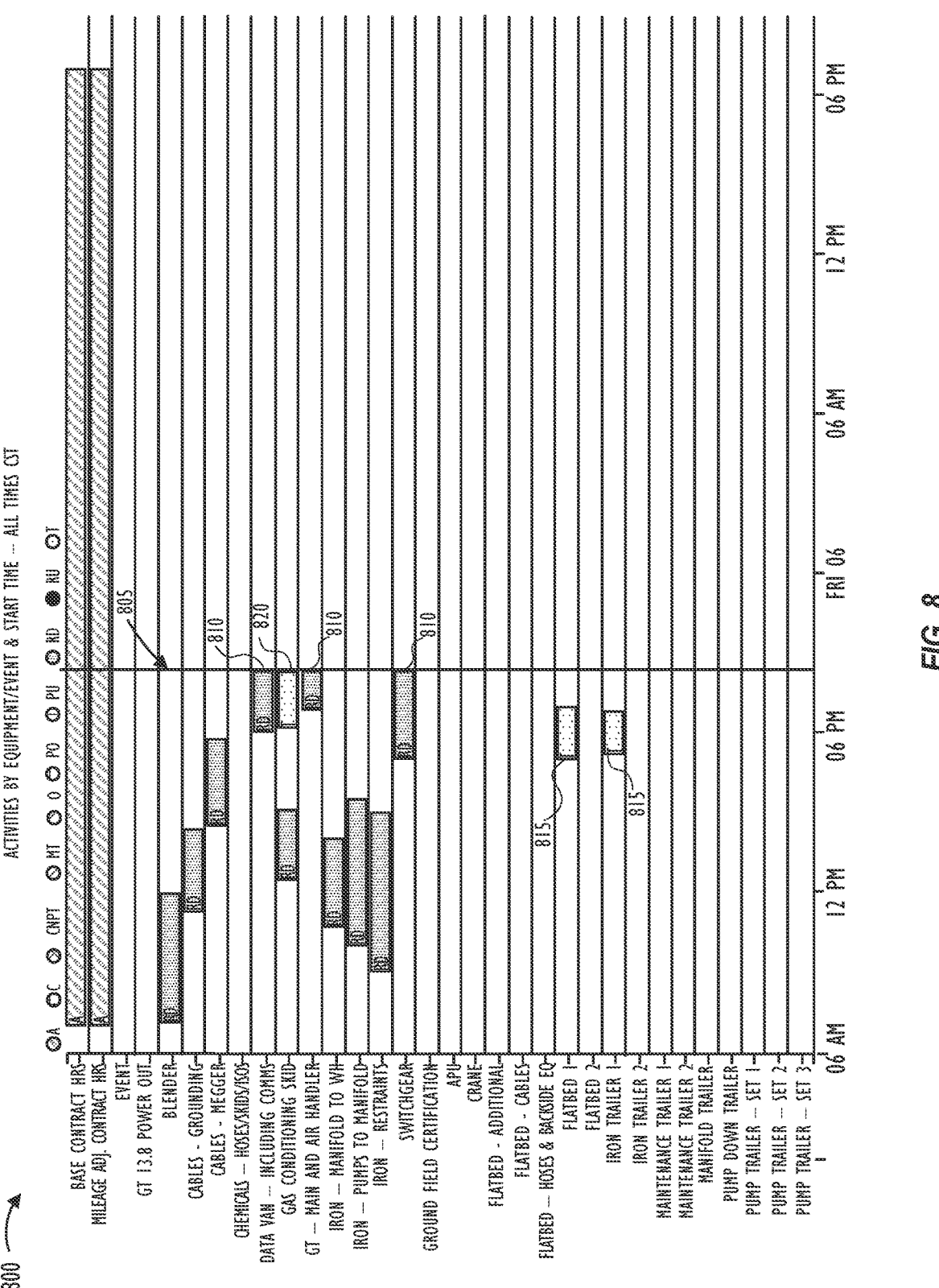
FIG. 8 illustrates an exemplary user interface showing a Gantt chart of a fleet move that is in progress, in accordance with some embodiments.

Using the activity data 316 available from the move in progress, the machine learning model evaluates the probability that the move will fall within or outside pre-defined total time expectations. In some embodiments, the models may accurately estimate this probability based on ~30% of all activity data of the fleet move (e.g., based on the activity data of the rig down events of the move). If it is predicted that the move will fall beyond the target, the matching engine 355 may evaluate all available data from historical moves to identify historical completed successful (on-time) moves which were on the same trajectory given the same inputs (activity data) and were able to successfully meet targets or minimize delays. In other words, the matching engine 355 searches the historical prior moves for moves that are similar up to the real-time current state of the move happening now. The matching engine 355 may then analyze activities from the matched historical moves that are future activities for the move happening now and execute scenario planning to determine what combination of future activities, proven to be possible through matched moves in the past, have the strongest probability to help the move meet overall expectations or minimize overall delays. This recommendation is programmatically passed back to the user interface of the application associated with the operator device 210 for the operations team to review and implement. Operation of the machine learning models and the recommendation module 350 is described in further detail below with an example. Example of Recommending an Update to the Prescribed Move Play FIG. 8 illustrates an exemplary interface 800 showing a Gantt chart generated based on real-time activity data 316 received from client devices for a move that is currently in progress. Interface 800 may be generated by the interface module 320 and show the current status of the different events to be performed per the prescribed move play for the current fleet move. As illustrated in FIG. 8, the fleet move began (e.g., based on occurrence of event 605 of FIG. 6) on Thursday, January 5 at 7 AM and is expected to be finished 36 hours later (as defined by the prescribed move play) on Friday, January 6 at 7 PM. Indicator 805 shows the live, present time (8:00 PM on January 5 in this case). As is evident from the interface 800, in the 13 hours that have elapsed in the move thus far, the crew has been unable to complete the first phase of the move (i.e., unable to complete all of the Rig Down (RD) events prescribed in the move play for this move). More specifically, of the 10 RD events activities that the respective assigned user groups need to complete, they have only finished 7 of them. 3 RD events (marked as 810 for: RD—Datavan, RD—GT (Gas Turbine main and air handler), and RD—Switchgear) are still in progress. Further, of the 28 transit activities that need to be completed during this move (per the prescribed move play), only 2 have been completed 13 hours into the move (marked as 815) and 1 transit event (T-Gas Conditioning Skid; 820) is in progress.

The activity data 316 for the fleet move that is in progress as described above and shown in FIG. 8, may be subjected to feature extraction and input to the machine learned models. The models may then output in real-time the probability of the move completing on time in 36 total hours and for the current prescribed move play, given what has been accomplished in 13 hours thus far. The models may also determine whether the move so far is "off-track" relative to the corresponding event-specific allotted time windows per the prescribed move play.

Based on the output of the models, the recommendation module 350 may generate one or more recommendations to improve the likelihood of the fleet move being completed within the predetermined timeframe or at least minimize delay. For example, in the case of the above example of the move that started Thursday at 7 am, and 13 hours into a 36-hour timeframe, the model determines that there is a high probability of failure of the move completing in 36-hours, the recommendation module 350 may generate one or more recommendations to update the move play (e.g., modify move play events, modify the order of the move play events, suggest an alternate move play, and the like). As a specific example, consider an original prescribed move play where the Event 1: "Cables Rig Up" needed to happen Friday from 1 pm-3 pm (2 hrs.); Event 2: "Cables Megger Testing" needed to immediately follow from 3 pm-4 pm (1 hr.); and Event 3 "Datavan Rig Up" (which has Events 1 and 2 as dependencies per the move play) needed to happen after Events 1 and 2 from 4 pm-6 pm (2 hrs.).

As a result of the above described operations of the recommendation module 350 (and in response to the operator accepting the recommended update to the move play), the updated move play for the fleet move may require that Event 1: "Cables Rig Up" now needs to happen Friday 2:30 pm-4:15 pm (1 hr. 45 min); Event 2: "Cables Megger Testing" is now scheduled from 4:15 pm 5:00 pm (45 min); and Event 3 "Datavan Rig Up" (which still needs to be performed last due to it having the Events 1 and 2 as blocking events, and which will still take the full 2 hours to complete) will now be scheduled from 5 pm-7 pm (i.e., finish at the end of the 36-hour total allotted timeframe for the fleet move).

Example Process for Fleet Move Orchestration

Figure 9:
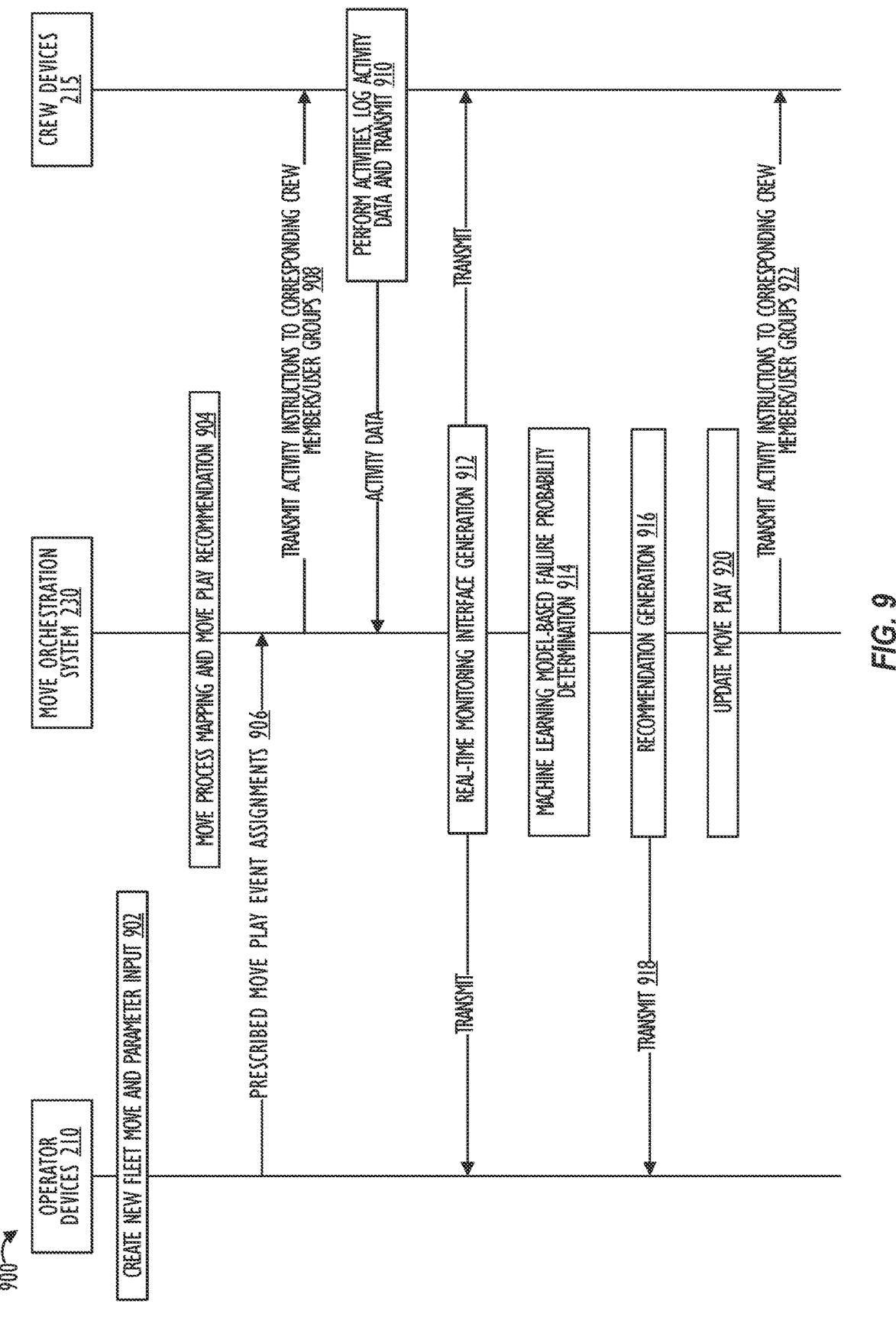
FIG. 9 illustrates a process flow of possible operations performed using the move orchestration system environment, in accordance with some embodiments.

FIG. 9 illustrates a process flow 900 of possible operations performed using the move orchestration system environment 200 of FIG. 2, in accordance with some embodiments. As shown in FIG. 9, process flow 900 illustrates operations performed between one or more operator devices 210, one or more crew devices 215, and the move orchestration system 230.

Method 900 begins at block 902 where an operator user with appropriate privileges (e.g., user with administrative privileges to create, manage, and execute fleet moves) may access a web portal or the application 212 on an operator device 210 to create a new fleet move and input parameters for the fleet move. For example, the operator may interact with a user interface on the application 212 to input parameters corresponding to a new move like date and time when the move should start, information regarding the fleet to be moved, information regarding crew members available for performing activities related to the move, information regarding the origin location pad layout and the destination location pad layout, etc. For example, the operator may interacting with the user interface on the application 212 may select a particular frac fleet from a list of a plurality of predefined frac fleets that are operable by the operator, and the operator may further select, e.g., from a list of predefined pad layouts like the pad layouts shown in FIGS. 5A and 5B, a first predefined pad layout the selected frac fleet is moving from and a second predefined pad layout the selected fleet is moving to.

At block 904, based on the parameters input at block 902, the planning engine of the move orchestration system 230 performs operations to prescribe a predefined move play from among a plurality of predefined move plays stored in the playbook database 312, and presents the selected move play as the recommended move play for the new fleet move to the operator of block 902 via, e.g., the user interface of the application 212. For example, based on the parameters input at block 902, the planning engine of the move orchestration system 230 may specify the predefined move play 600 of FIG. 6 as the recommended move play for the fleet move.

At step 906, the move play recommended at block 904 may be accepted by the operator (e.g., by providing input received at the operator device 210), and the operator may further interact with the application to create, and order move activities per the prescribed move play and assign them to individual crew members or user groups of one or more crew members. For example, in case the move play 600 of FIG. 6 is the prescribed move play, the operator at step 906 may identify, for each of the events (605, 615, 620, 610), the user groups 640 that are to perform the activities for that event. In some embodiments, the prescribed predefined move play may include recommendations for the number of crew members or user groups that should be assigned for each event, and at block 906, the operator may identify the specific user groups 640 based on the, e.g., prepopulated recommendations provided in the predefined prescribed move play. In some embodiments, the assignments may be automatically performed by the system 230 based on the prescribed move play and the parameters (including available personnel information) provided by the operator at block 902.

At step 908, based on assignments for the individual events and the corresponding start and end times per the prescribed move play, the system 230 may transmit respective notifications to the corresponding crew members to whom each individual event in the move play is assigned. For example, the system 230 may transmit a first notification to a first crew device 215 associated with a first crew member or user group to whom a first event in the prescribed move play is assigned and transmit a second notification to a second crew device 215 associated with a second crew member or user group to whom a second event in the prescribed move play is assigned. The notifications may include relevant information like the activities the crew member needs to perform, the date and time when the crew member needs to perform said activities, the amount of time the crew member has to perform said activity, information regarding any blocking activity that needs to have been completed first before the relevant activity can be performed, and so on. In some embodiments, the system 230 may further broadcast the overall move play prescribed for the fleet move to all relevant personnel associated with the fleet move.

At step 910, based on the received notifications the respective crew members may start performing the activities corresponding to the assigned events per the move play when the relevant date/time windows come up, and start logging corresponding activity data by interacting with their respective crew devices 215. For example, as can be seen in FIG. 6, while some events may be dependent on completion of other events (e.g., blocking activities), some of the events can be performed in parallel, by respective assigned crew members. Thus, as the corresponding start time (based on the received notification at block 908) approaches (and assuming there is no outstanding/delayed blocking activity), the assigned crew member may interact with the application 212 on the client device to specify that they are now beginning a particular activity, and after tasks related to the activity are completed (e.g., disassemble a piece of equipment, drive a piece of equipment from origin pad to destination pad, etc.), specify completion of the activity. The input activity log data may be associated with device generated timestamps and transmitted to the system 230. In some embodiments, the beginning and end of specific activities may automatically be detected by the crew device 215 without any input required (e.g., GPS data indicating when a particular piece of equipment left origin pad and when it arrived at destination pad). The activity data logged at block 910 corresponds to actual start and end times for each assigned activity. Since personnel may be performing respective assigned activities in parallel, the system 230 may receive the logged activity data from multiple crew devices 215 simultaneously.

At step 912, the system 230 may analyze the received activity data and generate a monitoring interface to enable operators and personnel to view the real-time progress and status of the fleet move. For example, the interface module of the system 230 may process the received activity data and generate a Gantt chart (e.g., FIGS. 7-8) based on the activity data, the prescribed move play, and the input parameters for the fleet move, to present the real-time status of the move. The system 230 may further make the real-time monitoring interface accessible to users of the operator devices 210 and/or the crew devices 215. For example, users may interact with the application 212 on the client device to access the real-time monitoring interface and understand the current status of the fleet move.

At block 914, based on the features extracted from the activity data received at block 910, the machine learning models of the system 230 may determine a probability of the fleet move having the prescribed move play failing to complete within a predetermined timeframe. For example, based on the activity data corresponding to the completed events of the ongoing move shown in FIG. 8, at the live, present time 805, the model may determine the probability of the fleet move having the prescribed move play failing to complete within 36-hours. If the model determines that the probability is low (i.e., the move will likely complete within 36-hours), the system 230 may continue to perform steps 910-914 repeatedly to continuously update the real-time monitoring interface and present the current status of the fleet move (that is running on time) to the user. If, on the other hand, the model determines that the probability is high (e.g., higher than a threshold) (i.e., the move will likely not complete within 36-hours), the system may perform additional operations described below.

At block 916, the recommendation module of the move orchestration system 230 may generate one or more recommendations configured to improve a likelihood of the fleet move being completed within the predetermined timeframe or reduce overtime. For example, the recommendation may be to update the prescribed move play in one or more instances. For example, the update may involve changing the order of completing the events of the move play (e.g., changing the start time and end time of two or more events), changing the duration of one or more events, changing the start time and/or end time of one or more events, changing the number of crew members assigned to one or more events, assigning an alternate play from the current point forward for the fleet move, and the like. At block 918, the generated recommendations may be transmitted to the operator of the operator device 210 for review and approval. At block 918, in addition to the generated recommendations, the system 230 may also transmit to the client devices the predicted probability indicating the likelihood of the move being late output by the machine learning models at block 914.

At block 920, in response to determining that the one or more of the recommendations have been accepted, the recommendation module of the move orchestration system 230 may perform processing to update the move play applied to the current fleet move from the present point forward based on the one or more recommendations accepted by the operator. The system may further transmit (block 922) instructions to one or more crew devices based on the updated move play to perform activities for one or more events according to the updated move play. Further, the machine learning models may calculate updated probability of the fleet move having the updated move play failing to complete within the predetermined timeframe. Thus, processing similar to the above-described processing of steps 906-922 may be repeatedly performed until the fleet move is completed (either on time or with minimized delay). Throughout the time period when the move is ongoing, as new activity data is received at block 910, the real-time monitoring interface may be updated to show the most current status of the move and of each event to be completed to complete the move. Further, one or more of each new instance of receipt of the activity data may act as a trigger for the machine learning models to determine an updated probability of the fleet move having the updated move play failing to complete within the predetermined timeframe. The system can thus continuously operate to keep the move "on-track" and on-time and upon determining that the move is falling behind schedule, take steps to present that information to operation personnel and further provide recommendations on specific areas or activities to focus on to attempt to get the move back "on-track" or at least minimize the amount of delay.

The model may highlight deviations from the move play thus far and recommend specific areas of focus for the crews to get back on track. An example might be that the move has deviated from the prescribed move play. The recommendation module identifies that the rig-down of cables took longer than expected, causing the order of equipment leaving pad to be incorrect. To get back on track, the recommendation module may recommend that the transit events must be completed in 12 hours or less, and power out from gas turbine needs to happen prior to the overall 34-hour (e.g., predetermined timeframe) mark.

Example Fleet Move Prediction Process

FIG. 10 is a flowchart illustrating a method 1000 for predicting fleet moves, in accordance with some embodiments. It should be noted that the process illustrated herein can include fewer, different, or additional steps in other embodiments. The interface module 320 of the move orchestration system 230 may detect 1005 that activity data 316 associated with a fleet move has been received, the activity data 316 associated with performance of activities for one or more events according to a move play (e.g., move play 600 of FIG. 6) prescribed for the fleet move (e.g., prescribed by planning engine 305). The feature extraction module 325 may extract 1010 a plurality of features associated with the activity data 316. The machine learning model database 340 may input 1015 the extracted features into a machine learning model, the machine learning model trained based on features of historical activity data of historical fleet moves 318. The move orchestration system 230 may receive 1020, as output from the machine learning model, a probability of the fleet move having the prescribed move play failing to complete within a predetermined timeframe. In response to the probability being higher than a threshold, the recommendation module 350 may generate 1025 one or more recommendations configured to improve a likelihood of the fleet move being completed within the predetermined timeframe or reduce overtime. The interface module 320 may cause 1030 a graphical user interface of a client device (e.g., operator device 210) to display the one or more recommendations.

Example Computer Architecture

Figure 11:
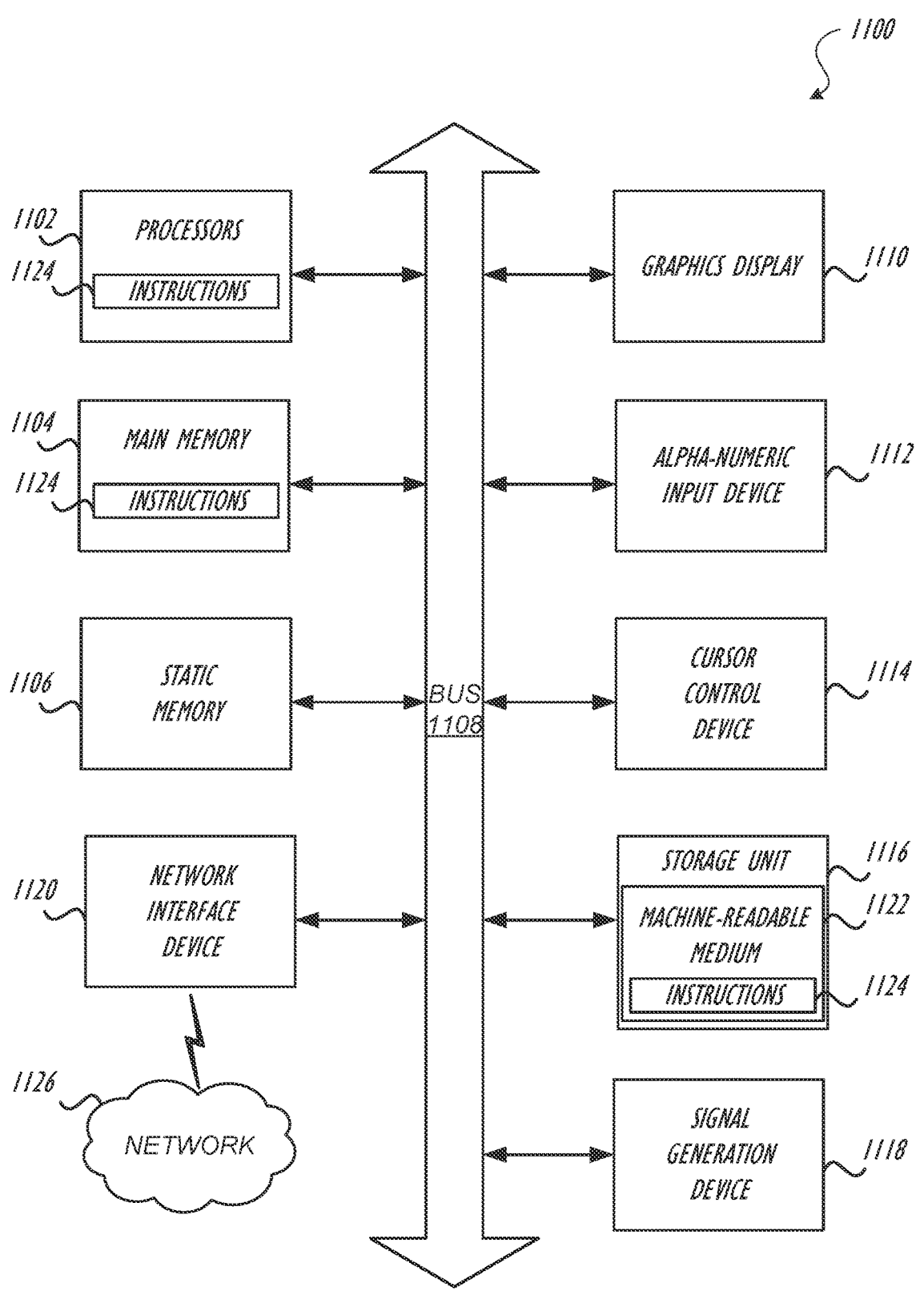
FIG. 11 is a block diagram illustrating components of an example computing machine, in accordance with some embodiments While certain embodiments will be described in connection with the illustrative embodiments shown herein, the invention is not limited to those embodiments. On the contrary, all alternatives, modifications, and equivalents are included within the spirit and scope of the invention as defined by the claims. In the drawings, which are not to scale, the same reference numerals are used throughout the description and in the drawing figures for components and elements having the same structure, and primed reference numerals are used for components and elements having a similar function and construction to those components and elements having the same unprimed reference numerals.

FIG. 11 is a block diagram illustrating components of an example computing machine that is capable of reading instructions from a computer-readable medium and execute them in a processor (or controller). A computer described herein may include a single computing machine shown in FIG. 11, a virtual machine, a distributed computing system that includes multiples nodes of computing machines shown in FIG. 11, or any other suitable arrangement of computing devices.

By way of example, FIG. 11 shows a diagrammatic representation of a computing machine in the example form of a computer system 1100 within which instructions 1124 (e.g., software, source code, program code, bytecode, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 11 may correspond to any software, hardware, or combined components shown in FIGS. 1, 2, 3, 5, and 7-10 including but not limited to, the data van 114, operator device 210, crew device 215, move orchestration system 230, interface 700, 800, process 900, method 1000, and various layers, modules, components, engines, and databased shown in the figures. While FIG. 11 shows various hardware and software elements, each of the components described in figures may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 1124 that specify actions to be taken by that machine. Further, while only a single machine is illustrated, the term "machine" and "computer" may also be taken to include any collection of machines that individually or jointly execute instructions 1124 to perform any one or more of the methodologies discussed herein.

The example computer system 1100 includes one or more processors 1102 such as a CPU (central processing unit), a GPU (graphics processing unit), a TPU (tensor processing unit), a DSP (digital signal processor), a system on a chip (SOC), a controller, a state machine, an application-specific integrated circuit (ASIC), a field-programmable gate array (FPGA), or any combination of these. Parts of the computing system 1100 may also include a memory 1104 that store computer code including instructions 1124 that may cause the processors 1102 to perform certain actions when the instructions are executed, directly or indirectly by the processors 1102. Instructions can be any directions, commands, or orders that may be stored in different forms, such as equipment-readable instructions, programming instructions including source code, and other communication signals and orders. Instructions may be used in a general sense and are not limited to machine-readable codes.

One and more methods described herein improve the operation speed of the processors 1102 and reduces the space required for the memory 1104. For example, the methods described herein reduce the complexity of the computation of the processors 1102 by applying one or more novel techniques that simplify the steps in training, reaching convergence, and generating results of the processors 1102. The algorithms described herein also reduces the size of the models and datasets to reduce the storage space requirement for memory 1104.

The performance of certain of the operations may be distributed among the more than processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations. Even though in the specification or the claims may refer some processes to be performed by a processor, this should be construed to include a joint operation of multiple distributed processors.

The computer system 1100 may include a main memory 1104, and a static memory 1106, which are configured to communicate with each other via a bus 1108. The computer system 1100 may further include a graphics display unit 1110 (e.g., a plasma display panel (PDP), a liquid crystal display (LCD), a projector, or a cathode ray tube (CRT)).

The graphics display unit 1110, controlled by the processors 1102, displays a GUI (GUI) to display one or more results and data generated by the processes described herein. The computer system 1100 may also include an alphanumeric input device 1112 (e.g., a keyboard), a cursor control device 1114 (e.g., a mouse, a trackball, a joystick, a motion sensor, or another pointing instrument), a storage unit 1116 (a hard drive, a solid state drive, a hybrid drive, a memory disk, etc.), a signal generation device 1118 (e.g., a speaker), and a network interface device 1120, which also are configured to communicate via the bus 1108.

The storage unit 1116 includes a computer-readable medium 1122 on which is stored instructions 1124 embodying any one or more of the methodologies or functions described herein. The instructions 1124 may also reside, completely or at least partially, within the main memory 1104 or within the processor 1102 (e.g., within a processor's cache memory) during execution thereof by the computer system 1100, the main memory 1104 and the processor 1102 also constituting computer-readable media. The instructions 1124 may be transmitted or received over a network 1126 via the network interface device 1120.

While computer-readable medium 1122 is shown in an example embodiment to be a single medium, the term "computer-readable medium" should be taken to include a single medium or multiple media (e.g., a centralized or distributed database, or associated caches and servers) able to store instructions (e.g., instructions 1124). The computer-readable medium may include any medium that is capable of storing instructions (e.g., instructions 1124) for execution by the processors (e.g., processors 1102) and that causes the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise.

Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A computer-implemented method comprising:

presenting a first user interface configured to receive, at a move orchestration system and from devices of crew members, activity data associated with one or more events of a multi-event frac fleet move play prescribed for a fleet move for moving a frac fleet from a first well site to a second well site, wherein the multi-event frac fleet move play includes a plurality of events including the one or more events, the plurality of events including at least a rig down event, a rig transit event, and a rig up event;

training a neural network of the move orchestration system using training data of a plurality of historical fleet moves, the training data including: (i) for each of the plurality of historical fleet moves, a label indicating whether the historical fleet move was completed within a corresponding allotted timeframe or failed to complete within the corresponding allotted timeframe, and (ii) for each of a plurality of historical events of each of the plurality of historical fleet moves, an allotted time duration and an actual time duration taken for completing the historical event;

inputting features of the activity data and the prescribed multi-event frac fleet move play into the trained neural network, the activity data including an actual time duration taken for completing each of the one or more events and the prescribed multi-event frac fleet move play including an allotted time duration for each of the plurality of events;

receiving, as output from the neural network, a probability of the fleet move having the prescribed multi-event frac fleet move play failing to complete within a predetermined allotted timeframe;

in response to the probability being higher than a threshold, generating one or more recommendations configured to improve a likelihood of the fleet move being completed within the predetermined allotted timeframe or reduce overtime, the recommendations including adjustments to at least one of (a) the allotted time duration of one or more remaining events of the multi-event frac fleet move play and (b) an order in which the remaining events are to be performed;

updating the prescribed multi-event frac fleet move play based on at least one of the recommendations by modifying the allotted time duration or an ordering of at least one remaining event of the multi-event frac fleet move play to produce an updated move play;

presenting a second user interface configured to transmit, from the move orchestration system, (i) the one or more recommendations to a device of a crew member and (ii) the updated move play together with updated activity instructions to devices of crew members assigned to the at least one remaining event; and controlling, based on the updated move play and by the move orchestration system, an operation of a component of one or more of a power generation transport, a fracturing pump transport, and a blender transport of the frac fleet.

2. The computer-implemented method of claim 1, wherein the one or more events include a plurality of rig down events of the fleet move according to the prescribed move play.

3. The computer-implemented method of claim 1, wherein generating the one or more recommendations comprises recommending a determined reduction in a time duration for completing at least one outstanding event of the plurality of events of the prescribed move play for the fleet move.

4. The computer-implemented method of claim 1, wherein generating the one or more recommendations comprises recommending at least one of an updated start time and an updated end time for performing at least one outstanding event of the plurality of events of the prescribed move play for the fleet move.

5. The computer-implemented method of claim 1, wherein generating the one or more recommendations comprises recommending a modification to a user group assigned to perform at least one outstanding event of the plurality of events of the move play prescribed for the fleet move.

6. The computer-implemented method of claim 1, wherein generating the one or more recommendations comprises recommending a revised order for completing two or more outstanding events of the plurality of events of the prescribed move play for the fleet move.

7. The computer-implemented method of claim 1, wherein generating the one or more recommendations comprises recommending an alternate move play for the fleet move.

8. The computer-implemented method of claim 1, wherein generating the one or more recommendations comprises:

identifying a subset of the plurality of historical fleet moves whose historical activity data is determined to match the activity data associated with the fleet move within a predetermined threshold;

accessing, from the matching historical activity data, outstanding event historical activity data associated with performance of activities for events that correspond to one or more outstanding events of the plurality of events associated with the prescribed move play for the fleet move, and generating the one or more recommendations based on the outstanding event historical activity data.

9. The computer-implemented method of claim 1, further comprising:

in response to receiving an input on the second user interface from the device of the operator indicating that the one or more recommendations have been accepted, updating the move play prescribed for the fleet move based on the one or more recommendations.

10. The computer-implemented method of claim 9, further comprising:

transmitting updated instructions through the first user interface to the device of the crew member, the updated instructions relating to the crew member performing activities for one or more events according to the updated move play.

11. The computer-implemented method of claim 9, further comprising:

receiving, as output from the neural network, an updated probability of the fleet move having the updated move play failing to complete within the predetermined timeframe.

12. The computer-implemented method of claim 1, further comprising:

generating a real-time monitoring interface based on the received activity data associated with the fleet move; wherein the second user interface configured transmits, to the device of the crew member, the generated real-time monitoring interface.

13. The computer-implemented method of claim 1, wherein each of the plurality of events of the move play is assigned to a corresponding crew member or group, and wherein activity data associated with each of the plurality of events is received by the move orchestration system from a device of the corresponding crew member or group.

14. The computer-implemented method of claim 1, wherein the fleet move comprises moving a hydraulic fracturing fleet for performing hydraulic fracturing operations from the first well site to the second well site.

15. The computer-implemented method of claim 14, wherein the first well site is associated with a first predefined pad layout for a plurality of components of the hydraulic fracturing fleet, and the second well site is associated with a second predefined layout for the plurality of components of the hydraulic fracturing fleet, and wherein the method further comprises:

prescribing, from among a plurality of predefined move plays, the move play based on at least the first and second predefined layouts, the move play including instructions orchestrating performance of activities for the plurality of events for the fleet move.

16. The computer-implemented method of claim 15, wherein the instructions orchestrating performance of activities for the plurality of events comprise at least one of:

a order for performance of activities related to the plurality of events;

a start time and an end time for each event; and a user group assigned for performance of activities related to each event.

17. A move orchestration system comprising:

one or more processors; and memory operatively coupled to the one or more processors and storing a neural network, wherein the memory comprises instructions that, when executed by the one or more processors, cause the one or more processors to perform operations comprising:

presenting a first user interface configured to receive, at the move orchestration system and from devices of crew members, activity data associated with one or more events of a multi-event frac fleet move play prescribed for a fleet move for moving a frac fleet from a first well site to a second well site, wherein the multi-event frac fleet move play includes a plurality of events including the one or more events, the plurality of events including at least a rig down event, a rig transit event, and a rig up event;

training the neural network using training data of a plurality of historical fleet moves, the training data including: (i) for each of the plurality of historical fleet moves, a label indicating whether the historical fleet move was completed within a corresponding allotted timeframe or failed to complete within the corresponding allotted timeframe, and (ii) for each of a plurality of historical events of each of the plurality of historical fleet moves, an allotted time duration and an actual time duration taken for completing the historical event;

inputting features of the activity data and the prescribed multi-event frac fleet move play into the trained neural network, the activity data including an actual time duration taken for completing each of the one or more events and the prescribed multi-event frac fleet move play including an allotted time duration for each of the plurality of events;

receiving, as output from the neural network, a probability of the fleet move having the prescribed multi-event frac fleet move play failing to complete within a predetermined allotted timeframe;

in response to the probability being higher than a threshold, generating one or more recommendations configured to improve a likelihood of the fleet move being completed within the predetermined allotted timeframe or reduce overtime, the recommendations including adjustments to at least one of (a) the allotted time duration of one or more remaining events of the multi-event frac fleet move play and (b) an order in which the remaining events are to be performed;

updating the prescribed multi-event frac fleet move play based on at least one of the recommendations by modifying the allotted time duration or an ordering of at least one remaining event of the multi-event frac fleet move play to produce an updated move play;

presenting a second user interface configured to transmit, from the move orchestration system, (i) the one or more recommendations to a device of a crew member and (ii) the updated move play together with updated activity instructions to devices of crew members assigned to the at least one remaining event; and controlling, based on the updated move play and by the move orchestration system, an operation of a component of one or more of a power generation transport, a fracturing pump transport, and a blender transport of the frac fleet.

18. The move orchestration system of claim 17, wherein the one or more events include a plurality of rig down events of the fleet move according to the prescribed move play.

19. The move orchestration system of claim 17, wherein the fleet move comprises moving a hydraulic fracturing fleet for performing hydraulic fracturing operations from the first well site to the second well site.

20. A non-transitory computer-readable storage medium storing instructions that, when executed by one or more processors, cause the one or more processors to perform operations comprising:

presenting a first user interface configured to receive, at a move orchestration system and from devices of crew members, activity data associated with one or more events of a multi-event frac fleet move play prescribed for a fleet move for moving a frac fleet from a first well site to a second well site, wherein the multi-event frac fleet move play includes a plurality of events including the one or more events, the plurality of events including at least a rig down event, a rig transit event, and a rig up event;

training a neural network of the move orchestration system using training data of a plurality of historical fleet moves, the training data including: (i) for each of the plurality of historical fleet moves, a label indicating whether the historical fleet move was completed within a corresponding allotted timeframe or failed to complete within the corresponding allotted timeframe, and (ii) for each of a plurality of historical events of each of the plurality of historical fleet moves, an allotted time duration and an actual time duration taken for completing the historical event;

inputting features of the activity data and the prescribed multi-event frac fleet move play into the trained neural network, the activity data including an actual time duration taken for completing each of the one or more events and the prescribed multi-event frac fleet move play including an allotted time duration for each of the plurality of events;

receiving, as output from the neural network, a probability of the fleet move having the prescribed multi-event frac fleet move play failing to complete within a predetermined allotted timeframe;

in response to the probability being higher than a threshold, generating one or more recommendations configured to improve a likelihood of the fleet move being completed within the predetermined allotted timeframe or reduce overtime, the recommendations including adjustments to at least one of (a) the allotted time duration of one or more remaining events of the multi-event frac fleet move play and (b) an order in which the remaining events are to be performed;

updating the prescribed multi-event frac fleet move play based on at least one of the recommendations by modifying the allotted time duration or an ordering of at least one remaining event of the multi-event frac fleet move play to produce an updated move play;

presenting a second user interface configured to transmit, from the move orchestration system, (i) the one or more recommendations to a device of a crew member and (ii) the updated move play together with updated activity instructions to devices of crew members assigned to the at least one remaining event; and controlling, based on the updated move play and by the move orchestration system, an operation of a component of one or more of a power generation transport, a fracturing pump transport, and a blender transport of the frac fleet.

* * * * *